United States Patent [19]

Kan, deceased et al.

[11] Patent Number: 4,855,763

[45] Date of Patent: Aug. 8, 1989

[54] IMAGE RECORDING APPARATUS

[75] Inventors: Fumitaka Kan, deceased, late of Tokyo, Japan, by Akiko Kan, successor; Norihiko Koizumi, Yokohama, Japan; Hiroshi Fukumoto, Kawasaki, Japan; Toshiya Yuasa, Mitaka, Japan; Noboru Tohyama, Kawasaki, Japan; Shinya Mishina, Atsugi, Japan; Hiroshi Tanioka, Yokohama, Japan

[73] Assignee: Canon Kabushiki Kaisha, Tokyo, Japan

[21] Appl. No.: 198,297

[22] Filed: May 24, 1988

[30] Foreign Application Priority Data

| | | | |
|---|---|---|---|
| May 25, 1987 | [JP] | Japan | 62-125969 |
| May 25, 1987 | [JP] | Japan | 62-125970 |
| May 25, 1987 | [JP] | Japan | 62-125971 |
| May 25, 1987 | [JP] | Japan | 62-125972 |
| May 25, 1987 | [JP] | Japan | 62-125973 |
| Jul. 20, 1987 | [JP] | Japan | 62-179074 |

[51] Int. Cl.$^4$ .............. G01D 15/00

[52] U.S. Cl. .............. 346/160.1; 346/155

[58] Field of Search .............. 346/155, 160.1, 134, 346/139 R, 139 C, 150, 153.1; 355/10; 101/DIG. 13; 400/14.1, 26

[56] References Cited

U.S. PATENT DOCUMENTS

| | | | |
|---|---|---|---|
| 4,504,138 | 3/1985 | Kuehnle et al. | 355/10 |
| 4,561,789 | 12/1985 | Saito | 346/160.1 |
| 4,763,143 | 8/1988 | Ohba et al. | 346/160.1 |

FOREIGN PATENT DOCUMENTS

| | | | |
|---|---|---|---|
| 37245767 | 7/1987 | Fed. Rep. of Germany | 346/160.1 |
| 8710576 | 7/1987 | France | 346/160.1 |
| 59-40627 | 3/1984 | Japan | 346/160.1 |
| 61-175191 | 7/1986 | Japan | 346/160.1 |
| 61-216752 | 9/1986 | Japan | 346/160.1 |
| 62-1709 | 1/1987 | Japan | 346/160.1 |
| 62-98590 | 4/1987 | Japan | 346/160.1 |
| 62-131584 | 5/1987 | Japan | 346/160.1 |
| 8717565 | 7/1987 | United Kingdom | 346/160.1 |

*Primary Examiner*—Arthur G. Evans

*Attorney, Agent, or Firm*—Fitzpatrick, Cella, Harper & Scinto

[57] ABSTRACT

An image recording apparatus for recording an image on a recording medium comprises ink transporting roll for transporting a fluid ink, energy applying element for selectively applying energy to the ink transported by the ink transporting roll, transfer member for transferring to the recording medium the ink whose transfer characteristics are changed upon selectively application of the energy and coating member disposed in an upstream of the energy applying element with respect to a transporting direction of the ink transporting roll so as to oppose the ink transporting roll, for supplying the ink having a predetermined thickness to the ink transporting roll. A distance between the ink transporting roll and the coating member is gradually reduced from the upstream to a downstream.

14 Claims, 26 Drawing Sheets

IMAGE RECORDING APPARATUS

BACKGROUND OF THE INVENTION

1. Field of the Invention

The present invention relates to an image recording apparatus capable of recording an image on a recording medium by using a fluid ink at low cost.

2. Related Background Art

Of information processing recording systems, various types of systems for recording information on normal paper have been developed. These systems are exemplified as an impact printer, an electrophotographic system, a laser printer, a thermal transfer printer, and the like.

A thermal transfer recording apparatus is most popular since it generates low noise and is compact. According to this recording system, an ink ribbon prepared by coating a heat meltable ink on a base sheet is used and heated with a recording head in accordance with an image pattern. The melted ink is then transferred to a recording sheet. The thermal transfer recording apparatus has many advantages such as low noise and a compact arrangement. In addition, the thermal transfer recording apparatus can be manufactured at low cost.

The thermal transfer recording apparatus, however, presents the following problems. In order to prepare an ink ribbon, a heat meltable ink must e coated on the heat-resistive base sheet by complex process. The ink ribbon is disposable. In other words, once the ink ribbon is used, it cannot be reused, thus undesirably increasing the running cost.

The present applicant proposed a recording apparatus (Japanese Patent Application No. 61-175191) as a means for solving the above problems. In this apparatus, a fluid ink is transported in the form of a film by an ink transporting means, and a predetermined energy is selectively applied to the ink to form an ink image of a pattern having adherence. The ink image is transferred to a recording medium.

According to the above recording apparatus, the ink ribbon as in the one of the conventional thermal transfer systems need not be used. Only an ink portion constituting the ink image is transferred to the recording medium. Therefore, the remaining ink portion which does not constitute the ink image can be repeatedly used.

The present applicant made a U.S. application (Ser. No. 75,045 filed on July 17, 1987), a German application (Application No. 3724576.7 filed on July 24, 1987), a French application (Application No. 87-10576 filed on July 24, 1987), and a British application (Application No. 87-17565 filed on July 24, 1987), each of which was a joinder of Japanese Patent Application Nos. 61-175191 (filed on July 25, 1986), 61-216752 (filed on Sept. 13, 1986), 62-1709 (filed on Jan. 9, 1987), 62-98590 (filed on Apr. 23, 1987), and 62-131584 (filed on May 29, 1987) on the basis of the declaration of priority thereof.

The invention of the present application to be described below is an improvement of the inventions of the above-mentioned Japanese, U.S., German, French, and British applications. The image recording ink and the image recording method, both which have been described in the above previous applications are apparently applicable to the invention of the present application.

SUMMARY OF THE INVENTION

It is an object of the present invention to provide an image recording apparatus capable of recording a clear image on a recording medium.

It is another object of the present invention to provide an image recording apparatus capable of recording an image on a recording medium at low cost.

It is still another object of the present invention to provide an image recording apparatus capable of recording an image on a recording medium without using a so-called conventional ink ribbon.

It is still another object of the present invention to provide an image recording apparatus capable of supplying an ink having a uniform thickness to a surface of the ink transporting means and preventing image omissions.

It is still another object of the present invention to provide an image recording apparatus capable of preventing formation of a ghost image or tailing in a recorded image and obtaining a high-quality recorded image by adding an ink mixing means.

It is still another object of the present invention to provide an image recording apparatus having a long service life.

It is still another object of the present invention to provide an image recording apparatus capable of preventing formation of a ghost image or tailing in a recorded image and obtaining a high-quality recorded image by applying a current pulse from one direction and then a current pulse from the other direction during energy application.

It is still another object of the present invention to provide an image recording apparatus which allows easy maintenance.

DETAILED DESCRIPTION OF THE PREFERRED EMBODIMENTS:

An embodiment of an image recording apparatus employing the present invention will be described with reference to the accompanying drawings. As previously described, the image recording ink and the image recording method, both of which have been described in the previous patent applications made by the present applicant, are applicable to the following embodiments.

The features and effects of the following embodiment will be described below.

The following embodiment exemplifies a recording apparatus capable of transferring a fluid ink to a recording medium in accordance with a selective application of energy. The recording apparatus is characterized by comprising an energy applying means for selectively applying energy to the ink transported by the ink transporting means, a transferring means for transferring onto the recording medium the ink whose transfer characteristics are changed upon the selective application of the energy, and a coating means, disposed to oppose the ink transporting means at an upstream of the energy applying means along the ink transporting direction of the ink transporting means, for supplying an ink having a predetermined thickness to the ink transporting means, wherein a distance between the ink transporting means and the coating means is gradually reduced from the upstream to a downstream.

According to the embodiment described above, the coating means can form a fluid ink layer having a uniform thickness, and this ink layer can be transported to the ink transporting means. At the same time, the ink transporting means can transport the uniform ink layer, and energy corresponding to an image signal is applied to the ink. An ink image, transfer characteristics of which have changed, can be formed and transferred to the recording medium. Therefore, predetermined image recording can be performed.

The ink portion which is not transferred to the recording medium can be supplied again to the ink transporting means. Since the distance between the ink transporting means and the coating means is gradually reduced from the upstream to the downstream, the ink can be mixed and supplied while it passes through the gap corresponding to the distance.

A recording apparatus which employs the above embodiment will be described with reference to the accompanying drawings.

Figure 1:
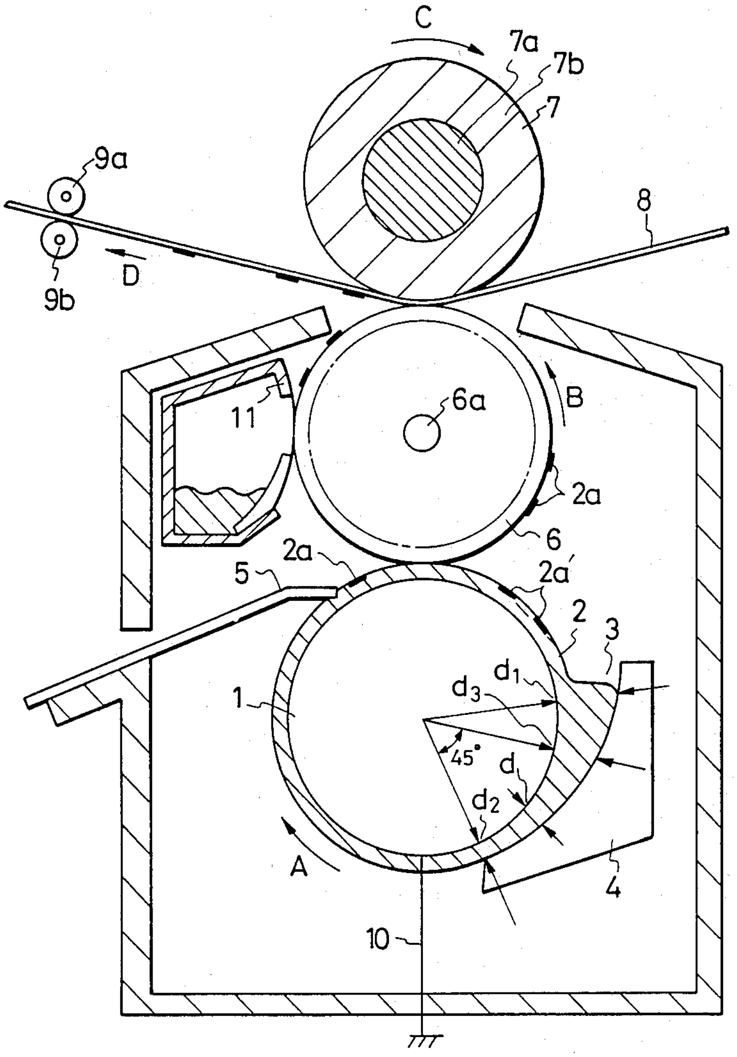
FIG. 1 is a sectional view of a recording apparatus according to an embodiment of the present invention.
Figure 2:
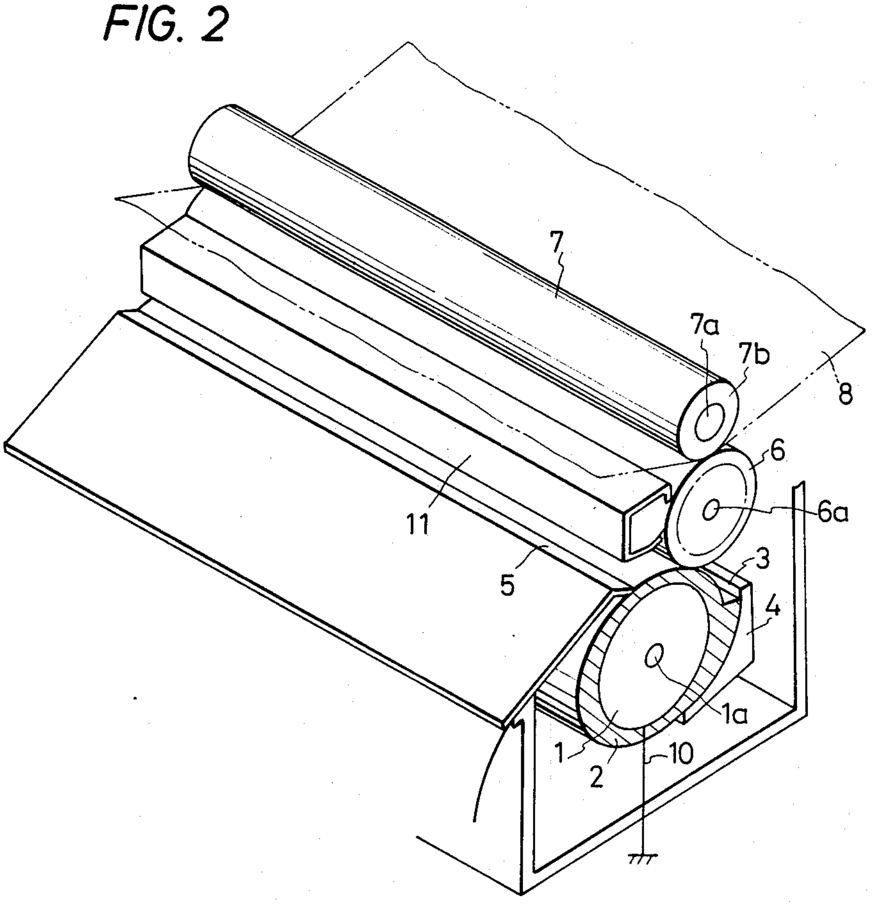
FIG. 2 is a perspective view of the recording apparatus shown in FIG. 1.

FIG. 1 is a sectional view of the recording apparatus according to this embodiment, and FIG. 2 is a perspective view thereof.

The overall arrangement of the recording apparatus will be described below. An ink transporting roll 1 serving as an ink transporting means can be rotated in a direction of an arrow A (clockwise) while transporting a fluid ink 2 stored in an ink reservoir 3.

The ink 2 has fluidity and a film formation property. In the normal state, the ink 2 rarely has adherence. However, when a predetermined energy, e.g., electrical energy is applied to the ink 2, the ink 2 has adherence. Therefore, when the ink transporting roll 1 is rotated, the ink is transported by a coating means 4 in the form of a film having a predetermined thickness onto the surface of the ink transporting roll 1 in the direction of the arrow A.

The ink 2 formed into a uniform layer on the surface of the ink transporting roll 1 receives electrical energy of an image pattern by an energy applying means 5 controlled by a control means (not shown). Upon application of the electrical energy, the ink has adherence and an ink image 2*a* is formed. The ink image 2*a* with adherence is brought into contact with an intermediate transfer roll 6 which serves as an intermediate transfer medium and is rotated in a direction of an arrow B (counterclockwise). The ink image 2*a* is therefore transferred to the surface of the roll 6. The ink 2 which is not transferred to the intermediate transfer roll 6 is recovered in the ink reservoir 3 upon rotation of the ink transporting roll 1 and is stirred and mixed in the ink reservoir 3.

The ink image 2*a* transferred to the intermediate transfer roll 6 is then transferred to a recording medium (e.g., a normal sheet, a plastic sheet, or the like; to be referred to as a recording sheet hereinafter) 8 passing between the intermediate transfer roll 6 and a transfer roll 7 serving as a transfer means which is in rolling contact with the intermediate transfer roll 6 in a direction of an arrow C (clockwise). The recording sheet 8 recorded with a predetermined image is discharged by a pair of discharge rolls 9*a* and 9*b* in a direction of an arrow D (the left side in FIG. 1).

The respective components of the recording apparatus will be described in detail below.

The ink transporting roll 1 consists of a material capable of transporting the fluid ink 2 in the form of a film thereon. In this embodiment, the ink transporting roll 1 comprises a conductive cylindrical body made of a metal such as stainless steel, aluminum, or iron and is driven and rotated by a driving means (not shown) at a predetermined speed in the direction of the arrow A.

The surface of the ink transporting roll 1 made of the material described above may be smooth. However, in order to improve the transporting characteristics of the fluid ink 2, the surface of the ink transporting roll 1 is preferably roughened to a proper degree.

The fluid ink 2 to be transported by the ink transporting roll 1 will be described below. This ink 2 has fluidity upon application of a predetermined external force and has a property for forming an ink film. More specifically, the ink 2 is formed into an ink layer on the surface of the roll 1 upon rotation of the ink transporting roll 1 and transported as the ink layer. The ink 2 preferably has a property for loosing adherence over time after the external force is no longer applied to the ink 2. The ink preferably has the following property. That is, if one ink mass is brought into another ink mass, their boundaries are lost and the masses get together.

Examples of the ink 2 having the above property are an ink gel (in a broad sense) containing a solvent with a crosslinked substance, and a ink sludge in which grains (their grain size preferably falls within the range of 0.1 to 100 μm, and more preferably 1 to 20 μm) are dispersed in a solvent having a relatively high viscosity (preferably 5,000 cps or more). An ink having properties of both the ink gel and the ink sludge is more preferable. An example of the ink 2 is described in Japanese Patent Application No. 61-175191 or 62-36904 filed by the present applicant.

Although this ink 2 has fluidity and a film formation property, it rarely has adherence. When a predetermined energy (e.g., electrical or thermal energy) is applied to the ink 2, its has adherence. In this case, the term "adherence" is selective adherence. When the ink 2 is brought into an object such as the intermediate transfer roll 6, the ink 2 is partially transferred to the object. Therefore, it is not essential whether the ink as a whole is adhesive.

The ink layer formed on the surface of the ink transporting roll 1 is rarely transferred to another object, e.g., the intermediate transfer roll 6 even if the ink 2 is brought into contact with this object. It is assumed that the ink gel is not transferred to the intermediate transfer roll 6 (except for a small amount of solvent) since the solvent in the ink gel is held in the crosslinked structure. It is also assumed that the ink sludge is not transferred to the intermediate transfer roll 6 since the ink grains are aligned at boundaries and a solvent component in the ink can hardly be brought into contact with the intermediate transfer roll 6.

When energy is applied to the ink gel or sludge, the crosslinked structure of the ink gel or the grain alignment state of the ink sludge is changed. Therefore, adherence corresponding to the magnitude of the energy is applied to the fluid ink.

When the ink 2 is coated on the ink transporting roll 1, it preferably has a property of a plastic substance. In addition, when the ink receives the energy by the energy applying means 5, it preferably has a property of an elastic substance.

For this reason, the ink 2 in the embodiment preferably has viscoelasticity to some extent (complex elastic modulus having elastic and viscous terms).

Figure 3A:
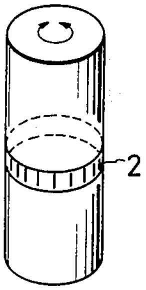
FIGS. 3A and 3B are views for explaining a method of measuring viscoelasticity.
Figure 3B:
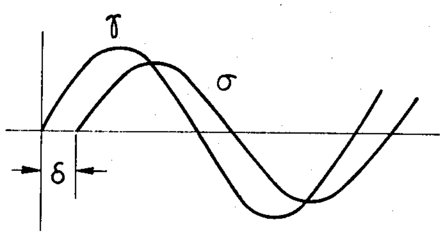

The range of the viscoelasticity is given as follows. For example, as shown in FIGS. 3A and 3B, assume that the ink 2 is given as a sample having a diameter of 25 mm and a thickness of 2 mm, that a sinusoidal strain $\gamma$ having an angular velocity of 1 rad/sec is applied to the sample in a direction indicated by the arrow (slip direction), and that a corresponding stress $\sigma$ and a corresponding phase error $\delta$ are detected. Under these assumptions, a complex elastic modulus $G^*$ is calculated as follows:

$$G^*=\sigma/\gamma=G'+iG''$$

where $G'$: storage elastic modulus $G''$: loss modulus

The ink 2 preferably has a ratio $G''/G'$, i.e., the ratio of the storage elastic modulus $G'$ to the loss modulus $G''$ of about 0.1 to 10.

If the ratio $G''/G'$ in the complex elastic modulus is less than 0.1 the ink cannot satisfactorily behave as an elastic substance. In this case, ink coating on the ink transporting roll 1 is insufficient. However, if the ratio $G''/G'$ exceeds 10, the ink 2 cannot satisfactorily behave as an elastic substance. In this case, recovery of elasticity in the path from the energy applying means 5 to the intermediate transfer roll 6 is insufficient.

The size of the sample and the value of the strain are assumed to be proper values in the recording apparatus.

The coating means 4 is located in the upstream of the energy applying means 5 with respect to the rotational direction of the ink transfer roll 1. The coating means 4 supplies the ink 2 to the ink transporting roll 1 so as to coat the surface of the roll 1 with an ink layer having a predetermined thickness. In this embodiment, the coating means 4 comprises a coating member 4 apart by a predetermined distance from the surface of the ink transporting roll 1, as shown in FIG. 1. Note that the ink 2 can be stored in the gap between the ink transporting roll 1 and the coating member 4, thereby forming the ink reservoir 3.

A distance d between the coating member 4 and the ink transporting roll 1 is defined such that an upstream distance d1 with respect to the rotational direction of the ink transporting roll 1 is large, that the distance is gradually decreased to toward the downstream side, and that a distance (minimum distance) d2 at the downstream end defines the thickness of the ink layer to be supplied to the ink transporting roll 1. In this case, the distance in the downstream end preferably falls within the range of about 0.3 to 3 mm.

The thickness of the ink layer is regulated by the coating member 4, and the thickness of the ink layer coated on the surface of the ink transporting roll 1 is slightly larger than the distance d2 at the downstream end between the coating member 4 and the ink transporting roll 1. Therefore, the distance d2 is preferably set to be slightly smaller than the thickness of the ink layer. In the coating system of this embodiment according to the finding of the present inventor, when the ink transporting roll 1 was rotated at high speed (e.g., a peripheral velocity of about 50 mm/s or more), the thickness of the ink layer was often smaller than the distance d2. In this case, the distance d2 is preferably set to be slightly larger than the thickness of the ink layer.

The thickness of the fluid ink 2 formed on the surface of the ink transporting roll 1 varies depending on fluidity or viscosity of the ink 2, the material and roughness of the surface of the ink transporting roll 1, and the speed of the roll 1. However, the thickness of the fluid ink 2 formed on the surface of the ink transporting roll 12 preferably falls within the range of about 0.1 to 5 mm and more preferably about 0.5 to 3 mm at the ink transfer position opposite to the intermediate transfer roll 6.

If the thickness of the layer of the ink 2 is less than 0.1 mm in this embodiment, it is difficult to form a uniform ink layer on the ink transporting roll 1. However, if the thickness of the ink layer exceeds 5 mm, it is difficult to transport the ink 2 while the surface layer of the ink layer is moved at a uniform peripheral velocity. In addition, it is not easy to energize the ink transporting roll 1 from the energy applying means 5 through the ink 2.

Surface roughness of the coating member 4 to be brought into contact with the ink 2 is preferably denser than that of the ink transporting roll 1. With this arrangement, the transporting force of the fluid ink 1 by the ink transporting roll 1 can be larger than that by the coating member 4. Therefore, excellent ink coating can be performed by the surface of the ink transporting roll 1.

The energy applying means 5 will be described below. A conventional thermal head may be used to apply thermal energy. However, in favor of energy efficiency, a recording electrode is used in this embodiment, thereby applying electrical energy.

An arrangement of the recording electrode 5 is illustrated in FIG. 4A. A plurality of parallel electrode elements 5*b* made of a metal such as copper are arranged on a substrate 5*a* made of glass epoxy, alumina, glass, or the like. An insulating coating made of polyimide or the like is formed on the electrode element 5*b* portions except for the distal end portions, i.e., the portions which are brought into contact with the ink 2. The ink transporting roll 1 is grounded through a ground line 10, and power is supplied between the roll 1 and the electrode elements 5*b* through the ink 2. Note that the exposed portions of the electrode elements 5*b* from the insulating coating 5*c* are preferably plated with gold, platinum, rhodium, or the like. Of these metal materials, platinum is preferably used from the viewpoint of durability.

When the recording electrode 5 is arranged in the recording apparatus, the electrode elements 5*b* are preferably slightly dipped in the ink layer formed on the ink transporting roll 1, as shown in FIG. 1. A dipping amount is about 0 to 1 mm and more preferably about 0.1 to 0.5 mm. In this manner, as the recording electrode 5 is slightly dipped in the ink layer, the energization effect can be improved. Note that no problem occurs even if the electrode elements 5*b* are dipped in the ink layer since the ink has viscoelasticity.

When the electrode elements 5*b* are dipped in the ink layer, as described above, a difference (i.e., step) between the end face of the substrate 5*a* and the end face of each electrode element 5*b* preferably falls within the range of about 0 to 100 μm. If possible, the step between both the end faces is eliminated. The end face of the substrate 5*a* is preferably aligned with the end face of each electrode element 5*a*. If a step is large, the ink image 2*a* formed upon energization from the electrode elements 5*b* is brought into fricative contact with and is broken by the end face of the substrate 5*a*. There is a fear of causing an image recording error.

An amount of energization for the recording electrode 5 is required to break the crosslinked structure and cause an electrochemical change if a crosslinked substance of the ink 2 is a substance prepared by crosslinking guar gum with borate ions. Therefore, the amount of energization is an amount for causing a crosslinking agent in a very small amount of about several hundreds of ppm to exchange electrons. This amount is about 1/10 of the amount required for applying thermal energy with a thermal head in thermal transfer and for causing the ink 2 to have viscosity.

The ink image 2*a* having adherence upon application of the energy is transferred to the intermediate transfer roll 6. A cylindrical member is located above the ink transporting roll 1 and is spaced apart by about 0.1 to 3 mm from the surface of the ink transporting roll 1. The intermediate transfer roll 6 is brought into contact with the ink layer formed on the ink transporting roll 1 and can be rotated by a driving means (not shown) in the direction of the arrow B.

A material for the surface of the intermediate transfer roll 6 may be the same as that of the ink transporting roll 1. However, the surface of the intermediate transfer roll 6 is preferably plated with chromium or coated with a silicone resin, a fluoroplastic, a polyethylene resin, or the like, thereby improving smoothness, an anti-contamination property and facilitating cleaning. In order to improve the transfer property of the ink 2 at the ink transfer position, the intermediate transfer roll 6 is preferably more smooth than that of the ink transporting roll 1.

At the ink transfer position where the ink image 2*a* having adherence is transferred to the intermediate transfer roll 6, a proper shearing force is preferably applied to the layer of the ink 2 formed between the intermediate transfer roll 6 and the ink transporting roll 1. For this reason, the peripheral velocity of the intermediate transfer roll 6 is preferably set to be equal to or lower than that of the surface layer of the ink layer on the ink transporting roll 1. However, the peripheral velocity of the intermediate transfer roll may be set to be equal to or slightly higher than that of the surface layer of the ink layer in consideration of elastic deformation of the ink depending on the properties of the nonadhesive ink.

The transfer roll 7 serves as a transfer means for transferring the ink image 2*a* formed on the intermediate transfer roll 6 onto the recording sheet 8. The transfer roll 7 has a cylindrical shape and comprises a layer 7*b* formed by nitrile rubber, silicone rubber, or the like and mounted on a metal shaft 7*a*. The transfer roller 7 is pressed with a force of about 0.1 to 5 kgf/cm against the intermediate transfer roll 6. The transfer roller 7 is rotated in a direction of an arrow C upon rotation of the intermediate transfer roll 6 to supply the recording sheet 8 in the direction of the arrow D in cooperation with the intermediate transfer roll 6. At the same time, the transfer roll 7 transfers the ink image 2*a* formed on the intermediate transfer roll 6 onto the recording sheet 8.

During transfer of the ink image 2*a* to the recording sheet 8, when a slight amount of ink is left on the roll 7 due to circumstances of the apparatus during recording and the material and the like of the ink 2, a cleaning means 11 may be arranged in the downstream of the contact position of the transfer roll 7 in the rotational direction of the intermediate transfer roll 6 and may be in contact with the surface of the roll 6, as shown in FIG. 1. The residual ink may be removed by the cleaning means 11 from the intermediate transfer roll 6.

Figure 5A:
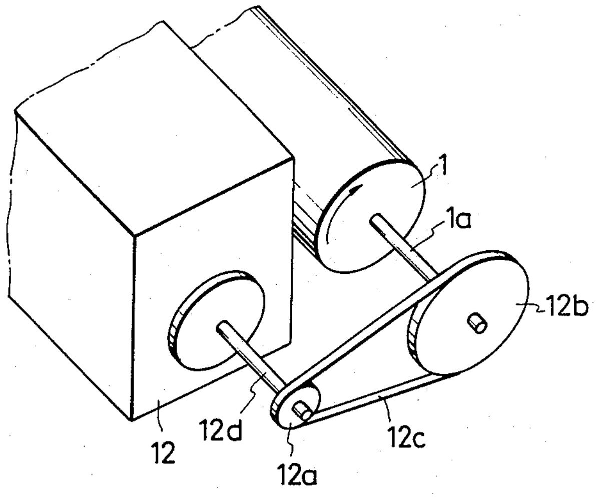
FIGS. 5A and 5B are views for explaining a drive system.
Figure 5B:
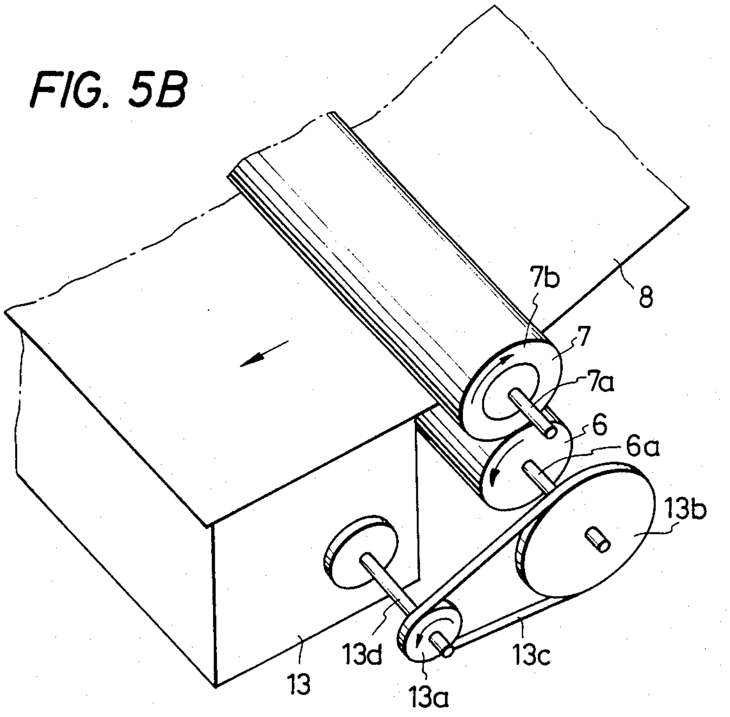

A drive system for the recording apparatus having the arrangement described is arranged as shown in FIGS. 5A and 5B. A rotational force of a motor 12 is transmitted to a pulley 12*a* of a motor shaft 12*d* and a pulley 12*b* mounted on a shaft 1*a* of the ink transporting roll 1 through a timing belt 12*c*. A rotational force of a motor 13 is transmitted to the intermediate transfer roll 6 from a pulley 13*a* of a motor shaft 13*d* through a timing belt 13*c* and a pulley 13*b* mounted on a shaft 6*a* of the intermediate transfer roll 6. Therefore, the transfer roll 7 is rotated upon rotation of the intermediate transfer roll 6.

An operation using the recording apparatus having the above arrangement will be described below.

Figure 6:
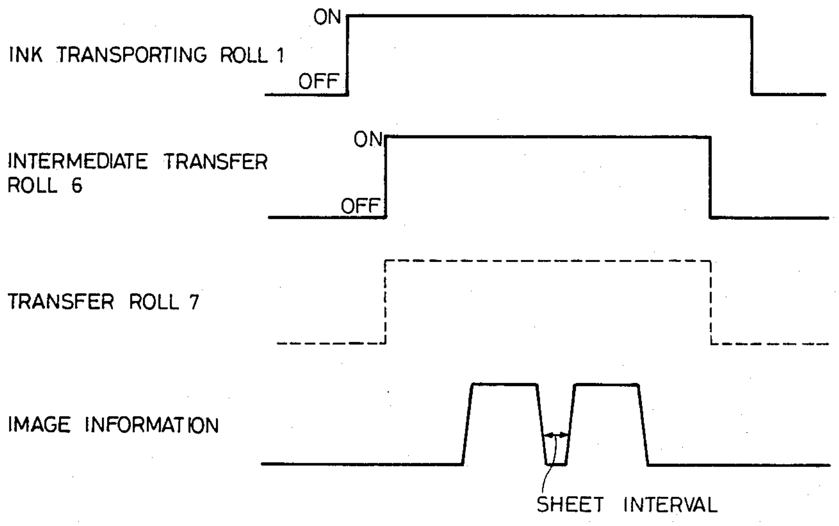
FIG. 6 is a timing chart for explaining the operation of the drive system shown in FIGS. 5A and 5B; wherein a coating comprises a rotary member.

As shown in a timing chart of FIG. 6, when the respective members are driven and the ink transporting roll 1 is rotated in the direction of the arrow A, the thickness of the fluid ink 2 in the ink reservoir 3 is regulated by the coating member 4. In this case, the distance d between the coating member 4 and the ink transporting roll 1 is gradually reduced from the upstream to the downstream. Therefore, nonuniformity of the ink layer supplied from the ink reservoir 3 to the ink transporting roll 1 can be minimized, and an ink layer with a smooth surface can be formed.

The ink 2 in the form of a layer on the surface of the ink transporting roll 1 is transported upon rotation of the ink transporting roll 1. At the energy application position, a voltage corresponding to a pattern represented by the image signal is applied from the recording electrode 5 controlled by a control means (not shown). A current is selectively supplied from the electrode elements 5*be* to the ink transporting roll 1 through the ink 2. For example, a crosslinked structure in the ink 2 is changed by an electrochemical reaction, and therefore selective adherence is given to the ink 2.

The ink 2 with selective adherence is further transported from the contact portion of the recording electrode 5 in the direction of he arrow A and reaches a transfer position where the layer of this ink 2 is brought into contact with the intermediate transfer roll 6. The ink 2 is transferred to the intermediate transfer roll 6 rotated in the direction of the arrow B in accordance with the above-mentioned adherence. Therefore, the ink image 2*a* is formed on the surface of the roll 6.

The ink image 2*a* formed on the intermediate transfer roll 6 is supplied upon rotation of the roll 6 and is brought into tight contact with the recording sheet 8 supplied to the ink image transfer position. The recording sheet 8 transferred with the ink image 2*a* is discharged in the direction of the arrow D. If fixing of the ink image 2*a* is not sufficient, a known fixing means using, e.g., heat or pressure may be arranged in the downstream of the ink image transfer position of the recording sheet 8.

Of the ink 2 components transported by the ink transporting roll 1, a component which is not applied with energy and part 2*a'* of the ink 2 applied with the energy on the surface of the ink are supplied in the direction of the arrow A without being transferred to the intermediate transfer roll 6. These ink components are stored again in the ink reservoir 3. In this case, the distance d between the ink transporting roll 1 and the coating member 4, both of which constitute the ink reservoir 3, is gradually reduced from the upstream to the downstream with respect to the rotational direction of the ink transporting roll 1. For this reason, the ink 2 stored in the ink reservoir 3 is stirred and mixed in the ink reservoir 3 upon rotation of the ink transporting roll 1. Restoration of the crosslinked structure broken by energy application can be accelerated, and the ink can be reused prior to retransportion to the ink transporting roll 1.

Energy is applied to the ink 2 by the recording electrode 5, the crosslinked structure of the ink 2 is destroyed, and the ink image 2*a* with adherence is transferred to and developed by the intermediate transfer roll 6. The transfer/development is not satisfactory, the nondeveloped ink, i.e., the residual ink 2*a'* is restored to a fluid state without adherence since the crosslinked structure can be restored. However, this phenomenon requires a certain length of time. When a recording speed is high, i.e., the speed of the ink transporting roll 1 is high, the residual ink 2*a'* reaches the contact portion with the intermediate transfer roll 6 upon rotation of the ink transporting roll 1 prior to restoration of the crosslinked structure. Therefore, the residual ink may be developed as a ghost on the intermediate transfer roll 6.

In this case, when the ink 2 is mixed, ions in the ink are dispersed and restoration of the crosslinked structure can be accelerated. A difference between the pH of the residual ink and that of the ink which has not received energy is reduced by mixing. Therefore, the ink can immediately restore the initial fluidity without adherence.

In the recording apparatus according to this embodiment as described above, adherence is given to the fluid ink 2 by the electrochemical behavior upon energization, thereby performing predetermined recording. Therefore, information can be recorded on normal paper or the like with a small amount of energy without the waste of ink. The ink containing the crosslinked structure has elasticity, image distortion at the energy application portion can b greatly reduced. In addition, as chemical coloring is not required, recording with good image stability and durability can be performed as compared with a conventional electrochemical recording method, i.e., the electrolytic recording by coloring based on an oxidation-reduction reaction upon energization The conductivity of the ink 2 is given by ion conduction. An ionic substance (most of such solutions are transparent) can be used as an electrolyte for giving the conductivity of the ink 2. Therefore, an ink of any color can be prepared by using a pigment or the like.

Another arrangements of the respective components in the above embodiment will be described below.

(1) Ink Transporting Means

In the above embodiment, the ink transporting means comprises the cylindrical ink transporting roll 1. However, the ink transporting means may comprise a belt- or sheet-like ink transporting means. When the belt- or sheet-like ink transporting means is used, it is fed from one side and taken up by the other side. However, the ink transporting means preferably comprises an endless belt- or sheet-like member.

In the above embodiment, the ink transporting roll 1 is made of a conductive member. However, when the roll 1 does not serve as part of the energization circuit (to be described later), the ink transporting roll 1 need not be made of a conductive member but can be made of an insulating body such as a resin member.

(2) Fluid Ink

In the above embodiment, energy is applied to the ink to give adherence to the ink. The ink image is then formed by using the ink with adherence. However, an ink portion without being applied with energy may have adherence, and the ink image may be formed by this ink.

(3) Coating Means

In the above embodiment, the coating means comprises a fixing means. However, in place of the fixing member, a rotary roll 14 spaced apart by a predetermined distance from the ink transporting roll 1 may be arranged to constitute the coating means, as shown in FIG. 7.

Figure 7:
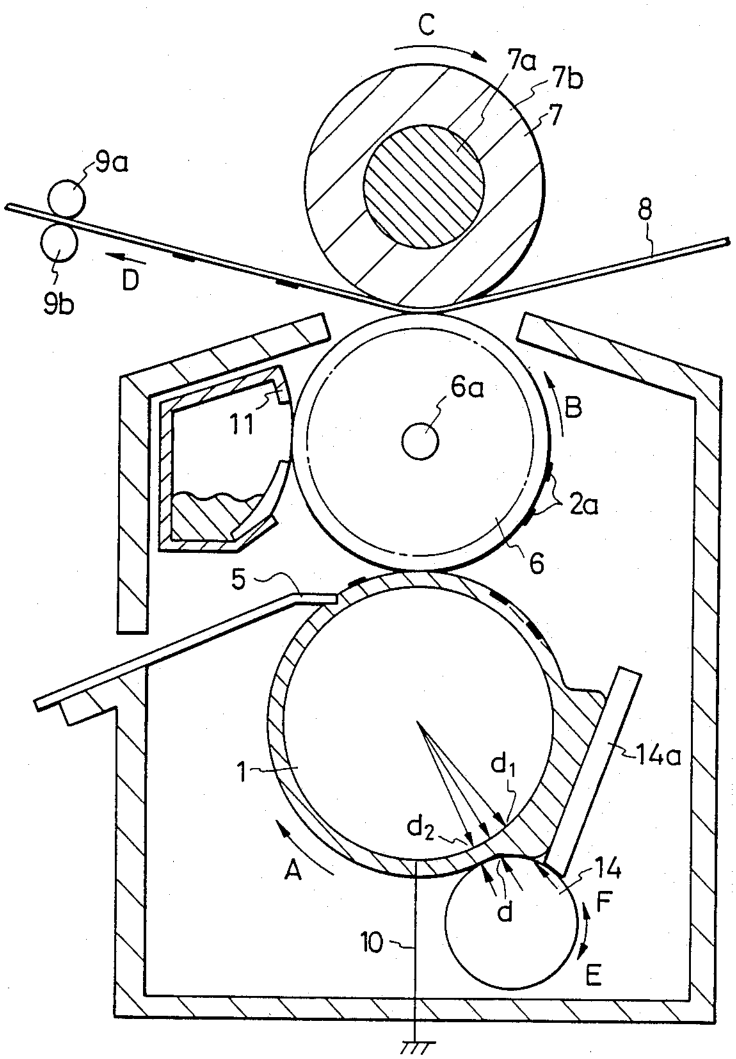

Referring to FIG. 7, the rotary roll 14 is spaced apart by the predetermined distance from the ink transporting roll 1, and the roll 14 can be rotated in a direction of an arrow E (clockwise) or a direction of an arrow F (counterclockwise) upon rotation of the ink transporting roll 1. Reference numeral 14*a* denotes a member for forming an ink reservoir 3. In this case, as in the above embodiment, a distance d between the ink transporting roll 1 and the rotary roll 14 is gradually reduced from an upstream distance d1 in the rotational direction of the ink transporting roll 1 to a distance d2 at the downstream end, thereby regulating the thickness of the ink layer.

In this case, when the rotary roll 14 is rotated in the direction of the arrow E in FIG. 7, the thickness of the ink layer formed on the ink transporting roll 1 can be decreased. However, when the rotary roll 14 is rotated in the direction of the arrow F, the thickness of the ink layer can be increased. In addition, when the speed of the rotary roll 14 is changed, the thickness of the ink layer to be coated on the ink transporting roll 1 can be adjusted. Moreover, when the rotary roll 14 is rotated, the ink in the ink reservoir 3 can be more effectively stirred and mixed.

The difference between the transporting forces of the ink transporting roll 1 and the coating means 4 will be described below. In the above embodiment, the surface of the ink transporting roll 1 is more rough than that of the coating member 4, so that the ink transporting force of the ink transporting roll 1 is set to be larger than that of the coating member 4. However, another arrangement may be employed, as described in Japanese Patent Application No. 62-1709 filed by the present applicant. For example, the surface of the coating member 4 may be coated with a silicone resin, a fluoroplastic, or a polyethylene resin, so that the surface energy of the coating member 4 can be lower than that of the ink transporting roll 1, thus differentiating the ink transporting force of the ink transporting roll 1 from that of the coating member 4.

Furthermore, in addition to differences between the surface roughness values and surface energy levels, magnetic grains may be contained in the fluid ink 2 and a magnet may be arranged inside the ink transporting roll 1. In this manner, the ink transporting force of the ink transporting roll 1 can be set to be larger than that of the coating member 4.

(4) Energy Applying Means

In the above embodiment, a current is supplied from the recording electrode 5 to the ink transporting roll 1 through the ink 2. However, a current may be supplied across the array of the electrode elements 5*b*. In this case, an electrochemical change in the ink 2 upon application of a current thereto causes an ink portion with a high pH and an ink portion with a low pH adjacent to the portion with the high pH on the surface of the ink layer. Therefore, only the surface layer of the ink layer need be stirred.

Figure 8A:
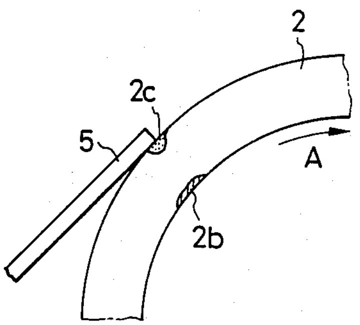
FIGS. 8A and 8B are views for explaining chemical changes upon energization.

In the above embodiment, when a current is supplied between the recording electrode 5 and the ink transporting roll 1, an ink portion 2*b* having a high pH is spaced apart from an ink portion 2*c* having a low pH in the chemical reaction of the ink 2, as shown in FIG. 8A. In this case, when a current corresponding to an image signal is supplied to the recording electrode 5 in one direction and then a current is supplied thereto in the other direction, the pH of the image portion is greatly changed so that a nonimage portion 2*e* whose pH is greatly changed in the other direction is formed next to an image portion 2*d* whose pH is greatly changed and crosslinked structure is destroyed. Therefore, restoration of the crosslinked structure can be immediately effected by ion diffusion upon mixing of the ink. In addition, the above energization method prevents an image trailing phenomenon caused by the recording electrode 5 brought into fricative contact with an image portion whose viscosity is decreased.

The above-mentioned energy applying means applies electrical energy to the ink. However, thermal energy may be applied to the ink. In this case, a conventional thermal head is used, and Joule heat is applied to the ink. If an electrochemical electrode reaction is to be prevented, an alternating signal having a frequency sufficiently higher than a value of a signal application period may be applied to the ink.

When an image is formed upon application of thermal energy as described above, the residual ink 2*a'* which has not been transferred to the intermediate transfer roll 6 is cooled and restores the crosslinked structure. When this ink is stirred in the ink reservoir 3, it is brought into contact with other ink gel components, thereby accelerating the restoration of the crosslinked structure.

When the ink is energized and heated, a conventional ink contains a conductive powder (usually black powder) to provide conductivity to the ink (Japanese Patent Publication No. 59-40627). The color of the ink is thus limited to black. However, since the conductivity is given to the ink 2 of this embodiment by the ionic conduction, an ink of any color can be prepared.

(5) Intermediate Transfer Medium

In the above embodiment, the intermediate transfer medium comprises the intermediate transfer roll 6. The intermediate transfer medium need not have a roll-like shape as in the ink transporting means. A metal or plastic film may be transported in one direction. Alternatively, an endless belt may be employed.

Figure 9:
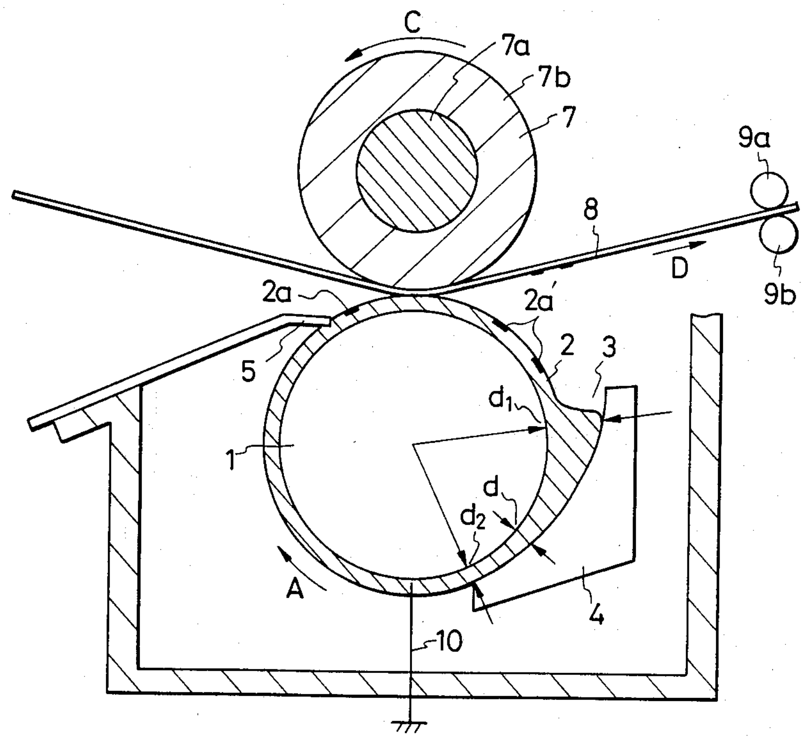
FIG. 9 is a view showing an arrangement in which an intermediate transfer roll is not included.

Without arranging the intermediate transfer medium, an ink image may be directly transferred from the ink transporting roll 1 to the recording sheet 8, as shown in FIG. 9.

(6) Cleaning Means

In the above embodiment, the residual ink left untransferred to the recording sheet 8 is removed from the intermediate transfer roll 6 by the cleaning means 11. However, when the ink image 2*a* can be perfectly transferred to the recording sheet 8, the cleaning means 11 may be omitted.

(7) Recording Medium

As described above, in an arrangement wherein the ink image 2a on the ink transporting roll 1 is directly transferred to the recording medium without arranging the intermediate transfer roll 6, when the recording medium comprises a paper sheet, a smooth sheet with a coating for preventing permeation of a solvent of the ink 2 inside the paper is preferably used. From the viewpoint of easy selection of a material for the fluid ink 2, a plastic film (e.g., polyester) or a metal film (e.g., aluminum) is preferably used in favor of surface characteristics.

In an arrangement wherein the intermediate transfer roll 6 is used as in the embodiment of FIG. 1, no problem occurs even if so-called normal paper is used as the recording medium. Therefore, no restrictions are imposed on types of paper.

(Experimental Results)

Experimental results of recording using the recording apparatus described above will be described below.

The recording apparatus shown in the embodiment of FIG. 1 was used to perform the following recording operation.

The fluid ink 2 contained the following components:

| | parts by weight |
|---|---|
| Components A: | |
| Water | 100 |
| PVA (Kishida Kagaku) Reagent (polymerization degree: about 2000; sponification degree: 98.5 to 99.4 mol %) | 9 |
| Blue Dye | 6 |
| Component B: | |
| Borax (decahydrate) | 0.6 |

The components were uniformly mixed while they were heated to 70° C., and the component B was added thereto. The resultant mixture was cooled to room temperature, thereby preparing a fluid ink gel.

The ink transporting roll 1 was prepared such that the surface of a 40-mm diameter stainless roll was roughened by sandblasting or flame spraying to obtain surface roughness Rz=about 100 μm. The coating member 4 was a polyacetal resin member whose surface roughness was set to be 10 μm or less. The coating member 4 was disposed such that the minimum distance d2 at the downstream end between the coating member 4 and the ink transporting roll 1 was set to be 2 mm, that a distance d3 at the upstream at 45° from the downstream end was set to be 6 mm, and that the distance d was gradually reduced from the upstream to the downstream.

The intermediate transfer roll 6 was a 40-mm iron roll whose surface was plated with hard chromium A distance between the intermediate transfer roll 6 and the ink transporting roll 1 was set to be 2 mm.

The transfer roll 8 was a roll prepared such that a 5-mm thick silicone rubber layer was formed on a 10-mm diameter iron roll. The transfer roll 8 was pressed against the intermediate transfer roll 6 with a force of 0.1 kgf/cm and was rotated at the same speed as that of the intermediate transfer roll 6.

With the above arrangement, the intermediate transfer roll 6 was rotated at about 18 rpm and the ink transporting roll 1 was rotated at about 18 rpm. The ink 2 was formed into an ink layer on the coating member 4, and a 2-mm thick ink layer is formed on the surface of the ink transporting roll 1. In this case, the ink layer was not transferred to the intermediate transfer roll 6 when a current was not applied to the ink.

Figure 4:
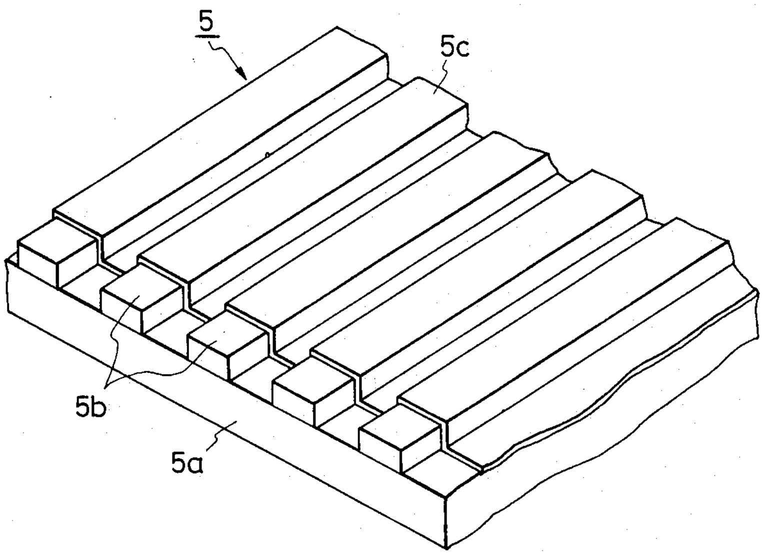
FIG. 4 is a view for explaining an arrangement of a recording electrode.
Figure 11:
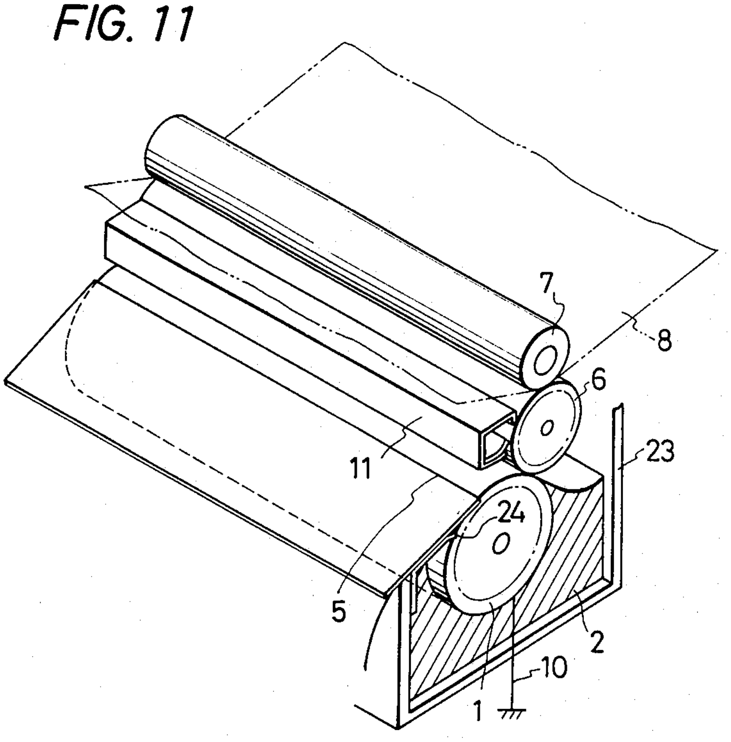
FIG. 11 is a perspective view of the recording apparatus shown in FIG. 10.

The electrode elements 5b whose distal end portions were exposed in an area of 100 μm×100 μm were used to constitute the recording electrode 5, as shown in FIG. 4. The electrode 5 served as an anode, and the ink transporting roll 1 served as a cathode. 1-μs pulses having a voltage of 15 V were applied between the electrode 5 and the ink transporting roll 1 through the ink 2, as shown in FIG. 11. A current of about 2 mA flowed per electrode element 5b. Therefore, a clear image of 100 μm×150 μm was obtained at pitches of 500 μm.

According to this embodiment as described above, an ink image is formed upon application of the predetermined energy to the fluid ink. Unlike the conventional case, an ink ribbon having a solid ink layer need not be used. Therefore, recording at very low running cost can be performed.

Energy is applied by electric energization. An amount of energization during recording can be reduced to about 1/10 of thermal transfer recording using a conventional thermal head. Therefore, the running cost can also be reduced due to energy consumption.

When the predetermined layout of ink transporting means and the coating means is established, a uniform ink layer can be formed on the ink transporting means. At the same time, the residual ink after the image transfer can be effectively stirred and mixed to prevent formation of a ghost image and trailing, thus obtaining a high-quality recorded image.

Another embodiment of the present invention will be described with reference to FIGS. 10 to 17.

This embodiment exemplifies an image recording apparatus capable of improving ink transfer properties and image quality by optimal layout of an energy applying means for an ink transporting means. More specifically, the recording apparatus can transfer a fluid ink to a transfer medium in accordance with selective application of energy. The recording apparatus characterized by comprising an ink transporting means for transporting the fluid ink, an energy applying means for selectively applying energy to the ink transported by the ink transporting means, and a means for transferring to a transfer medium the ink whose transfer characteristics are changed upon selective application of the energy, wherein a distance between the energy applying means and said ink transporting means is equal to or smaller than that between the ink transporting means and the transfer medium.

According to this embodiment, the fluid ink is transported by the ink transfer means and energy corresponding to an image signal is applied to the ink. An ink image whose transfer characteristics have been changed is transferred to the transfer medium, thereby performing predetermined image recording.

When the fluid ink has viscoelasticity, the ink layer is brought into contact with the energy applying means and then its elasticity is recovered. The thickness of the ink layer becomes larger than the distance between the ink transporting means and the energy applying means. In this case, when the distance between the ink transporting means and the transfer medium is set to be larger than the distance between the ink transporting means and the energy applying means, the ink layer does not clog at the contact position with the transfer medium. Therefore, the transfer property of the ink for the transfer medium can be stabilized.

The recording apparatus according to this embodiment will be described with reference to the accompanying drawings. The same reference numerals as in the previous embodiment denote the same parts in this embodiment, and a detailed description thereof will be omitted.

Figure 10:
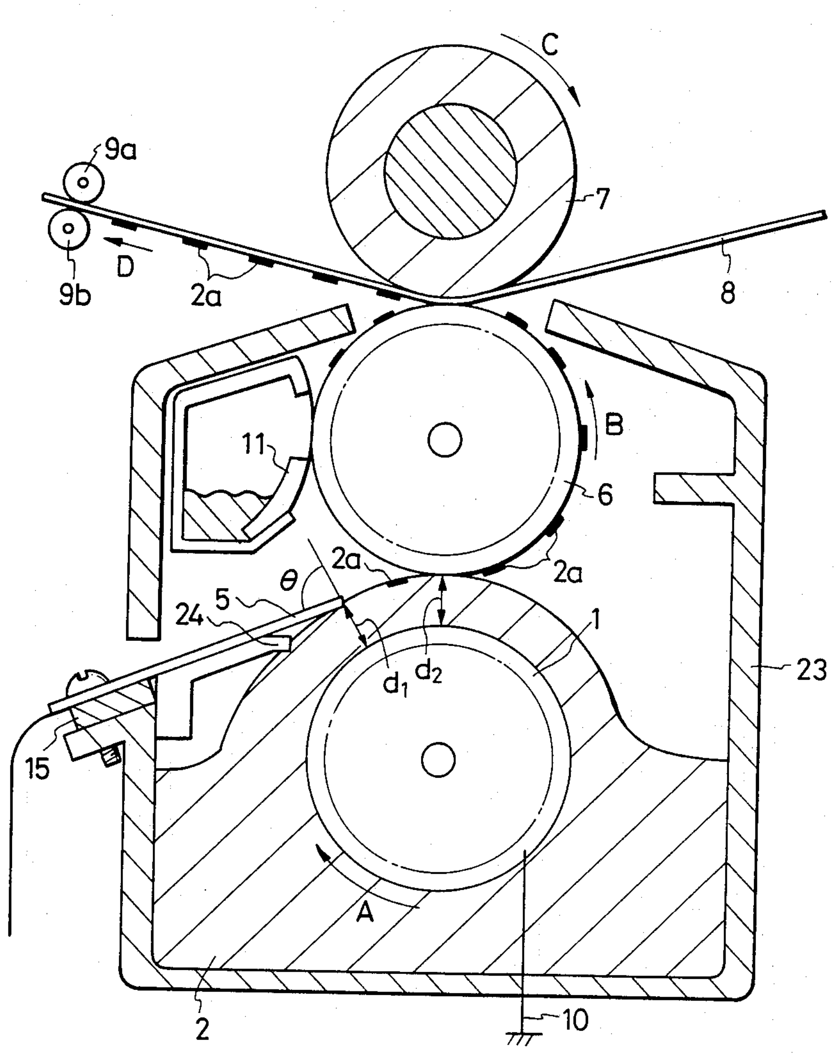
FIG. 10 is a sectional view of a recording apparatus according to another embodiment of the present invention.

FIG. 10 is a sectional view of the recording apparatus according to this embodiment, and FIG. 11 is a perspective view thereof.

The overall arrangement of the recording apparatus will be described below. An ink transporting roll 1 serving as an ink transporting means is partially dipped in an ink 2 stored in an ink tank 23 (the ink transporting roll 1 seems to be submerged in the ink 2 since the recording apparatus is operated in FIG. 10). The ink transporting roll 1 can be rotated in a direction of an arrow A (clockwise) while supplying the ink 2 from the ink tank 23.

In this embodiment, the range of viscoelasticity of the ink 2 is given as follows. For example, as shown in FIGS. 3A and 3B, assume that the ink 2 is given as a sample having a diameter of 25 mm and a thickness of 2 mm, that a sinusoidal strain $\gamma$ having an angular velocity of 1 rad/sec is applied to the sample in a direction indicated by the arrow (slip direction), and that a corresponding stress o and a corresponding phase error $\delta$ are detected. Under these assumptions, a complex elastic modulus G* is calculated as follows:

$$G^* = \sigma/\gamma = G' + iG''$$

where

G′: storage elastic modulus

G″: loss modulus

The ink 2 preferably has a ratio G″/G′, i.e., the ratio of the storage elastic modulus G′ to the loss modulus G″ of about 0.1 to 10.

If the ratio G″/G′ in the complex elastic modulus is less than 0.1, the ink cannot satisfactorily behave as an elastic substance. In this case, ink coating on the ink transporting roll 1 is insufficient. However, if the ratio G″/G′ exceeds 10, the ink 2 cannot satisfactorily behave as an elastic substance. In this case, recovery of elasticity in the path from the energy applying means 5 to the intermediate transfer roll 6 is insufficient.

The size of the sample and the value of the strain are assumed to be proper values in the recording apparatus.

A layer thickness regulating means 24 is disposed in the upstream of the energy applying means 5 with respect to the rotational direction of the ink transporting roll 1. The layer thickness regulating means 24 applies the ink 2 having a predetermined thickness on the surface of the ink transporting roll 1. In this embodiment, the layer thickness regulating means 24 comprises a blade member, as shown in FIG. 10. The distal end of the blade member 4 is spaced apart be about 0.5 to 3 mm from the surface of the ink transporting roll 1.

The layer thickness is regulated by the blade member 24, and the thickness of the ink layer formed on the surface of the ink transporting roll 1 can be slightly larger than the distance between the blade member 4 and the ink transporting roll 1 due to a ballast effect or the like unique to the viscoelastic body. Therefore, the distance between the blade member and the ink transporting roll 1 is preferably set to be slightly smaller than the thickness of the ink layer.

The thickness of the fluid ink 2 formed on the surface of the ink transporting roll 1 varies depending on fluidity or viscosity of the ink 2, the material and roughness of the surface of the ink transporting roll 1, and the rotation speed of the roll 1. However, the thickness of the fluid ink 2 formed on the surface of the ink transporting roll 12 preferably falls within the range of about 0.1 to 5 mm and more preferably about 0.5 to 3 mm at the ink transfer position opposite to the intermediate transfer roll 6.

If the thickness of the layer of the ink 2 is less than 0.1 mm in this embodiment, it is difficult to form a uniform ink layer on the ink transporting roll 1. However, if the thickness of the ink layer exceeds 5 mm, it is difficult to transport the ink 2 while the surface layer of the ink layer is carried at a uniform peripheral velocity. In addition, it is not easy to energize the ink transporting roll 1 from the energy applying means 5 through the ink 2.

In this embodiment, an angle $\theta$ formed between a recording electrode 5 and a normal to the ink transporting roll 1 preferably falls within the range of $0° < \theta < 90°$ at the upstream transporting side of the ink 2. If the angle $\theta < 0°$ is given, irregular coating of the ink 2 tends to be caused. However, if the angle $\theta > 90°$ is given, contact between the ink layer and electrode layers **5*b*** tends to be unsatisfactory.

An amount of energization for the recording electrode 5 is required to break the crosslinked structure and cause an electrochemical change if a crosslinked substance of the ink 2 is a substance prepared by crosslinking guar gum with borate ions. Therefore, the amount of energization is an amount for causing a crosslinking agent in a very small amount of about several hundreds of ppm to exchange electrons. This amount is about 1/10 of the amount required for applying thermal energy with a thermal head in thermal transfer and for causing the ink 2 to have adherence.

In this embodiment, the positional relationship between the ink transporting roll 1, the recording electrode 5, and the intermediate transfer roll 6 is given as follows. The distance d1 between the surface of the ink transporting roll 1 and the recording electrode 5 is set to be equal to or smaller than (d1≦d2) the distance d2 between the surface of the ink transporting roll 1 an the surface of the intermediate transfer roll 6 at a position where the ink image **2*a*** is to be transferred due to the following reason.

Figure 12:
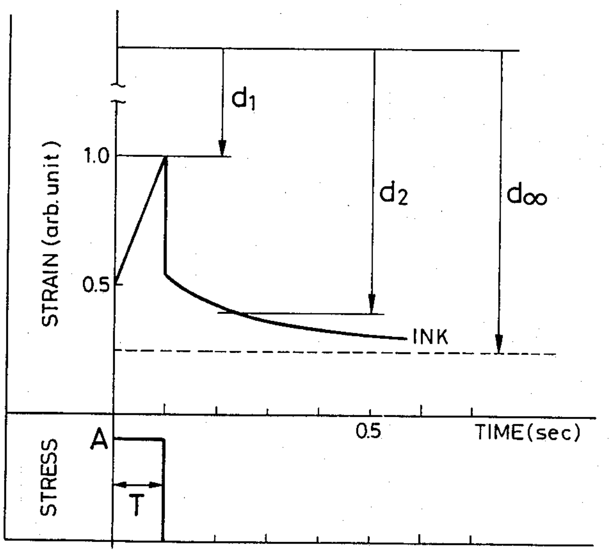
FIG. 12 is a graph for explaining strain caused by a viscoelastic stress as a function of time.

Since the fluid ink 2 has viscoelasticity, the response time of strain upon application of a predetermined pulse stress (stress=A; time=T) varies, as shown in FIG. 12. More specifically, while a stress acts on the fluid ink 1, the strain is large. However, when the stress is eliminated, elasticity of the fluid ink 2 can be restored. If the pulse stress is given as a stress acting when the recording electrode 5 is brought into contact with the ink layer, the thickness of the ink layer which receives the maximum strain corresponds to the distance d1 between the ink transporting roll 1 and the recording electrode 5. The ink layer can restore its elasticity while it passes through the recording layer 5 and reaches a contact position with the intermediate transfer roll 6. The distance d2 between the ink transporting roll 1 and the intermediate transfer roll 6 is preferably set to be equal to or larger than the distance d1.

Figure 13:
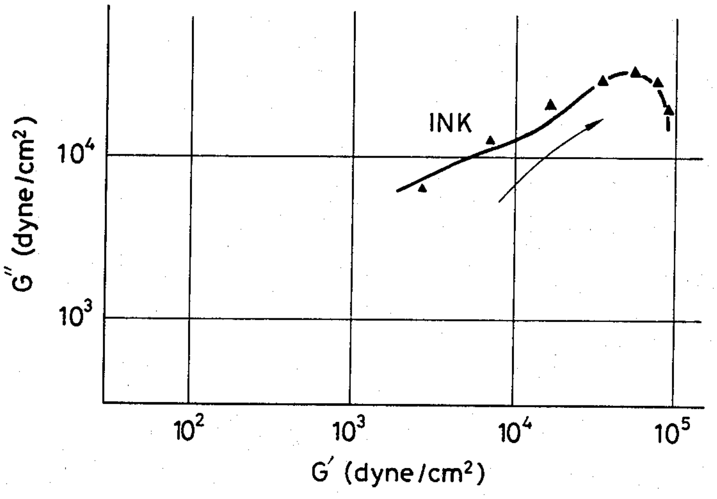
FIG. 13 is a graph for explaining a G′-G″ viscoelastic curve.

The above consideration will be described in more detail. In order to measure the viscoelasticity of the ink 2, an angular velocity w of the sinusoidal strain shown in FIG. 3A is changed to obtain the storage elastic modulus G' and the loss modulus G". By using these measured results, a G'-G" curve, for example, is obtained, as shown in FIG. 13. Reference symbol x in FIG. 13 represents a direction along which the angular velocity $\omega$ is increased.

Figure 14:
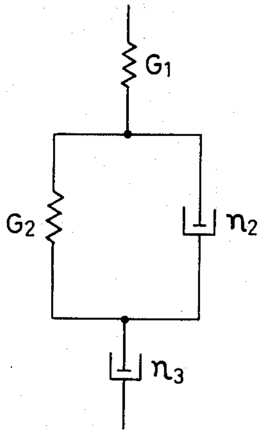
FIG. 14 is a view for explaining frequency response of viscoelasticity.

The storage elastic modulus G' and the loss modulus G" can be generally represented using a 4-element model in the field of rheology as follows, as shown in FIG. 14:

$$G' = \frac{G_2\,[\alpha^2\beta(\omega\tau)^4 + (1+\beta)(\omega\tau)]}{[1-\alpha\beta(\omega\tau)^2]^2 + (\alpha+\beta+1)^2(\omega\tau)^2} \quad (1)$$

$$G'' = \frac{G_2\,[(\omega\tau) + \alpha(\alpha+1)\,(\omega\tau)^3]}{[1-\alpha\beta(\omega\tau)^2]^2 + (\alpha+\beta+1)^2(\omega\tau)^2}$$

$$\text{for } \alpha = \eta_2/\eta_3,\ \beta = G_2/G_1,\ \tau = \eta_3/G_2 \quad (2)$$

where $G_1$, $G_2$: elastic module $\eta_2$, $\eta_3$: viscosities

Parameters $\alpha$, $\beta$, and $\tau$ are determined from the measured G'-G" curve and many G'-G" curves obtained by simulation using equations (1) and (2).

When the time response of strain obtained by applying the pulse stress shown in FIG. 12 to the ink 2 is calculated according to the Laplacian transform. The time response $\epsilon(t)$ of the strain is given as follows:

if $t < 0$, then $$\epsilon(t) = 0$$

if $0 \leqq t \leqq T$, then $$\epsilon(t) = (A/G_2)\{\beta + (1 - e^{-t}) + t/\tau\} \quad (3)$$

if $T < t$, then $$\epsilon(t) = (A/G_2)\{(e^{t} - 1)\,e^{-t} + t/\tau\} \quad (4)$$

if $t = \infty$, then $$\epsilon(\infty) = (A/G_2)(T/\tau) = A(T/\eta_3) \quad (5)$$

When the time t is sufficiently long, $d\infty$ is given in FIG. 12. In other words, d=corresponds to the case given by equation (5). Unless the distance d2 between the ink transporting roll 1 and the intermediate transfer roll 6 is smaller than the $d\infty$, the ink layer cannot be brought into contact with the intermediate transfer roll 6. Therefore, the distance d2 preferably falls within the range of $d1 \leqq d2 < d\infty$. An operation using the recording apparatus having the arrangement as described above will be described below. The respective components are driven in accordance with the timing chart in FIG. 6, and the ink transporting roll 1 is rotated in the direction of the arrow A. The fluid ink 2 is formed as a layer by the blade member on the surface of the ink transporting roll 1. The ink layer is transported upon rotation of the ink transporting roll 1. At the energy application position where the ink is brought into contact with the recording electrode, the transported ink 2 receives a voltage of a pattern corresponding to the image signal from the recording electrode 5 controlled by a control means (not shown). A current is supplied from the electrode elements 5*b* to the ink transporting roll 1 through the ink 2. For example, the crosslinked structure in the ink 2 is changed by the electrochemical reaction, and selective adherence is given to the ink 2.

The ink 2 with selective adherence is transported from the contact position of the recording electrode 5 in the direction of the arrow A. Elasticity of the ink layer is restored, and the ink layer reaches the intermediate transfer roll 6, as shown in FIG. 12. The ink layer is thus brought into contact with the roll 6. By this contact, the ink with adherence is transferred to or developed by the intermediate transfer roll 6 which is rotated in the direction of the arrow B. Therefore, an ink image 2*a* is formed on the surface of the roll 6.

The ink image 2*a* formed on the intermediate transfer roll 6 is transported upon rotation of the roll 6 and is brought into tight contact with a recording sheet 8 transported to the ink image transfer position. The recording sheet 8 which has received the ink image 2*a* is discharged in a direction of an arrow D. If fixing of the ink image 2*a* is not sufficient, for example, a known fixing means using heat or pressure may be arranged in the downstream of the ink image transfer position of the recording sheet 9.

Of the ink 2 components transported by the ink transporting roll 1, a component which has not received energy is transported in the direction of the arrow A without being transferred to the intermediate transfer roll 6. This ink component is separated from the intermediate transfer roll 6 by the behavior based on a gravitational force or the like in association with the viscoelasticity of the ink component. The separated ink component is recovered in the ink tank 3 and can be reused.

Figure 15:
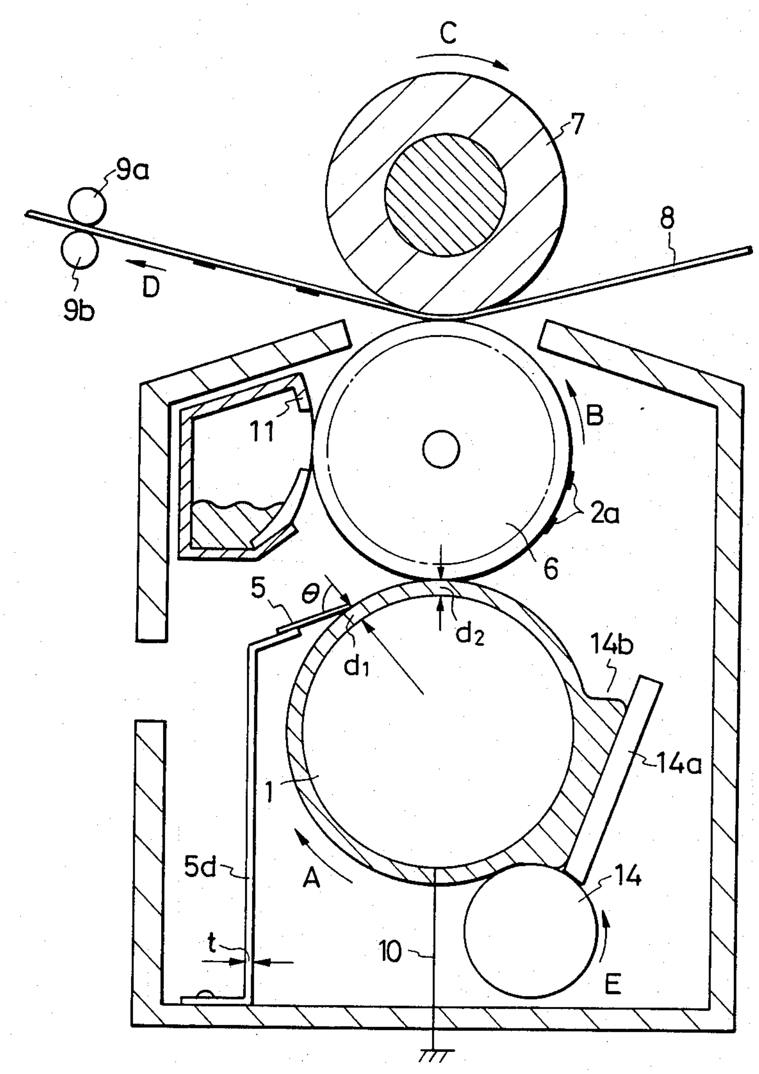
FIG. 15 is a view for explaining an arrangement wherein a layer thickness regulating means is constituted by a rotary member.

In the above embodiment, the blade member is used as the layer thickness regulating means. However, in place of the blade member, a rotary roll 14 may be spaced apart by a predetermined distance from the ink transporting roll 1, as shown in FIG. 15, thereby constituting the layer thickness regulating means. Reference numeral 14*a* in FIG. 15 denotes a member for forming an ink reservoir 14*b*.

In an arrangement wherein the ink transporting roll 1 having an ink layer can be replaced, when the ink having a predetermined thickness is coated on the surface of the ink transporting roll 1 or when the ink layer preformed on the ink transporting roll 1 is no longer present owing to the rotation speed of ink transporting roll 1 and the viscoelesticity of ink 2, the layer thickness regulating means 4 may be omitted.

In the above embodiment, a current is supplied from the recording electrode 5 to the ink transporting roll 1 through the ink 2. However, a current may be supplied across the array of the electrode elements 5*b*.

In the above embodiment, when a current corresponding to an image signal is supplied to the recording electrode 5 in one direction and then a current is supplied thereto in the other direction, a nonimage portion 2*e* whose pH is greatly changed in the other direction is formed next to an image portion 2*d* whose pH is greatly changed and crosslinked structure is destroyed. Therefore, restoration of the crosslinked structure can be immediately effected by ion diffusion upon stirring of the ink, even if the ink which has received energy is not perfectly transferred to the intermediate transfer roll 6. Therefore, a ghost can be effectively prevented.

The recording electrode 5 is preferably arranged to allow adjustment of the distance d1 with the ink transporting roll 1 in accordance with the thickness of the ink layer coated on the ink transporting roll 1 or the viscoelasticity of the ink 2 (e.g., the recording electrode 5 is mounted on a support having a spring property (to be described later)).

When an image is formed upon application of thermal energy, e.g., the fluid ink 2 is changed from a gel state to a sol state and the adhesion characteristics of the ink 2 with respect to the intermediate transfer roll 6 can be changed.

In the above embodiment, the intermediate transfer medium comprises the intermediate transfer roll 6. However, the roll-like medium need not be used in the same manner as in the ink transporting means. A metal or plastic film may be transported along one direction, or an endless belt may be used instead.

Figure 16:
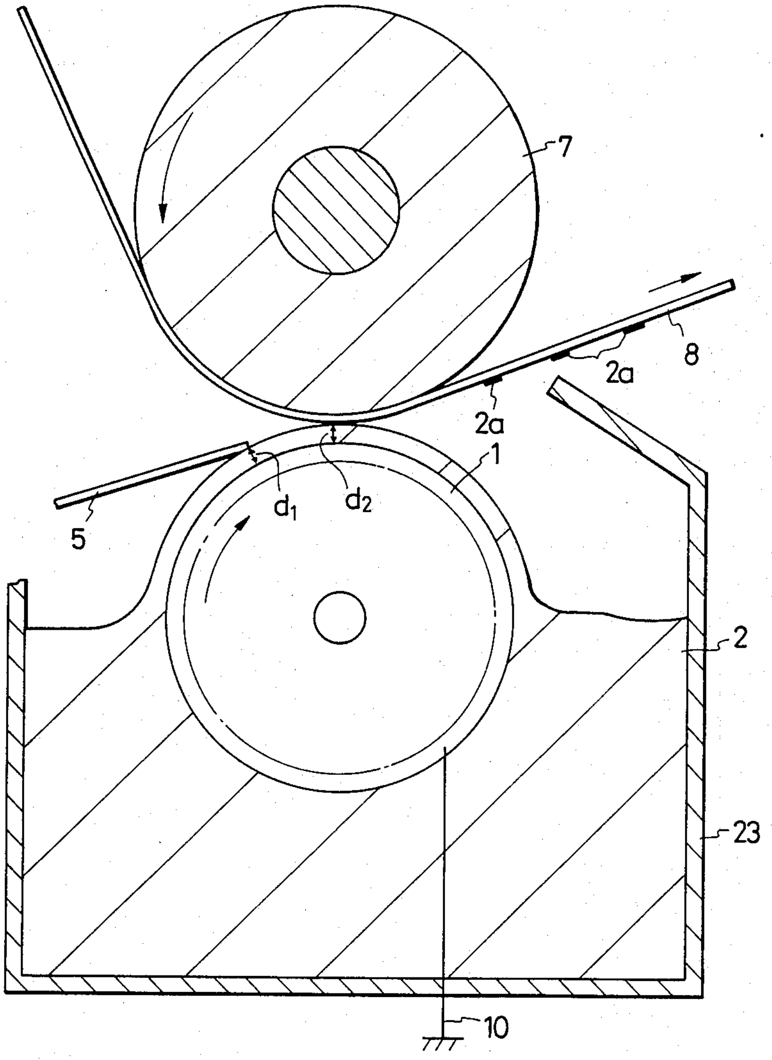
FIG. 16 is a view for explaining an arrangement in which an intermediate transfer roll is not included.

As shown in FIG. 16, without using the intermediate transfer medium, the ink image may be directly transferred from the ink transporting roll 1 to the recording sheet 8. In this case, the recording sheet 8 serves as a transfer medium, and the distance d1 between the ink transporting roll 1 and the recording electrode 5 and the distance d2 between the ink transporting roll 1 and the recording sheet supplied by the transfer roll 7 may satisfy relation $d1 \leqq d2$.

(Experimental Results)

Experimental results of recording using the recording apparatus described above will be described below.

Experiment 1

An ink 2 in Experiment 1 in this embodiment had the same components as those in the experiment of the previous embodiment.

The components A were uniformly mixed with each other while they were heated to 70° C., and the component B was added thereto. The resultant mixture was cooled to room temperature to obtain an ink gel. In this case, an acid or an alkali is preferably used to set the pH to be 7 to 11.

Figure 17:
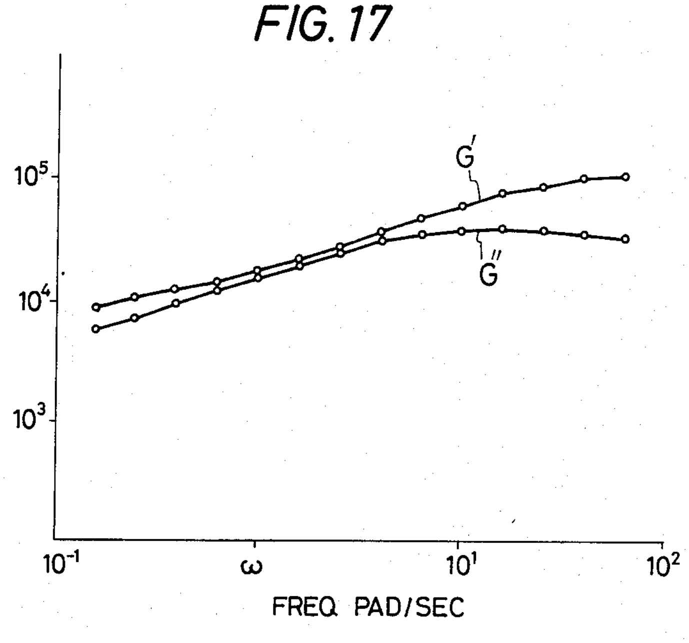
FIG. 17 is a graph for explaining the relationship between the storage elastic modulus and the loss modulus with respect to the angular velocity of the viscoelasticity.
Figure 19:
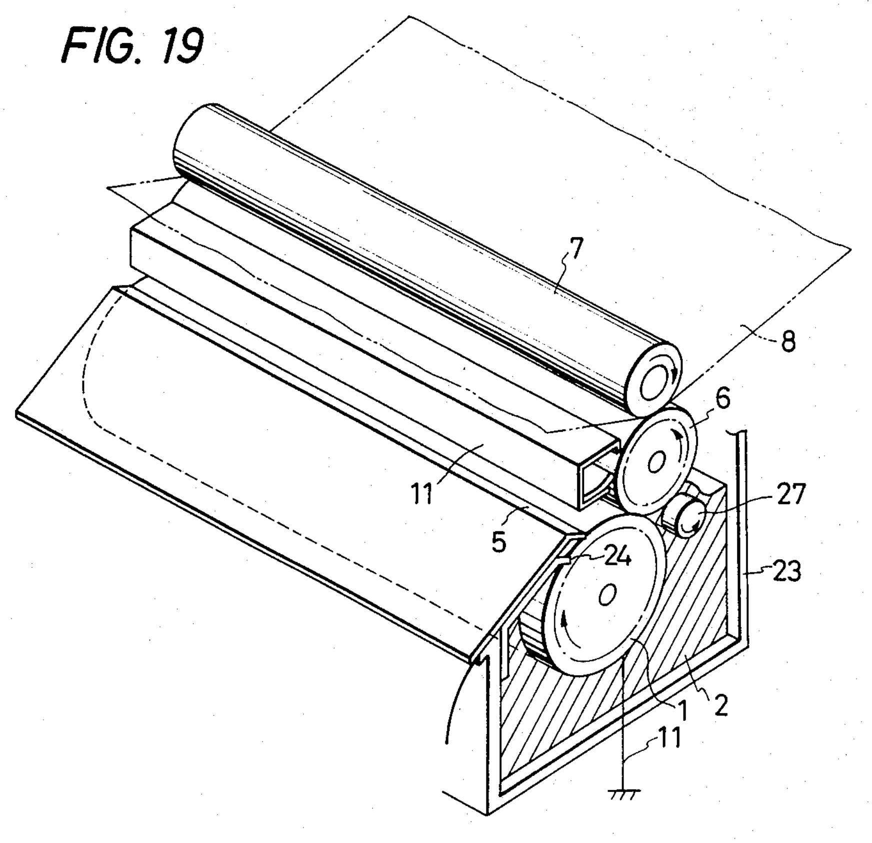
FIG. 19 is a perspective view of he recording apparatus shown in FIG. 18.

The viscoelasticity of the ink was measured by a rheometer RMS-800 (tradename) available from Rheometrics Corp. under the conditions given in FIG. 3. The storage elastic modulus G' and the loss modulus G" for the angular velocity $\omega$ were obtained, as shown in FIG. 17.

The ink transporting roll 1 was prepared such that the surface of a 20-mm diameter stainless roll was roughened by sandblasting or flame spraying to obtain surface roughness Rz=about 100 $\mu$m. The intermediate transfer roll 6 was a 20-mm iron roll whose surface was plated with hard chromium. A distance between the intermediate transfer roll 6 and the ink transporting roll 1 was set to be 2 mm.

The transfer roll 7 was a roll prepared such that a 4-mm thick silicone rubber layer was formed on a 12-mm diameter iron roll. The transfer roll 8 was pressed against the intermediate transfer roll 6 with a force of 0.1 kgf/cm and was rotated at the same speed as that of the intermediate transfer roll 6.

With the above arrangement, the ink transporting roll 1 was rotated at about 36 rpm in the direction of the arrow A to form a layer of the ink 2 on the roll 1. At the same time, the intermediate transfer roll 6 was rotated at about 36 rpm in the direction of the arrow B. In this case, when electrical energy was not applied from the recording electrode 5 to the layer of the ink 2, a small amount of water was transferred to the intermediate transfer roll 6. However, the ink 2 was rarely transferred to the intermediate transfer roll 6.

The electrode elements 5*b* whose distal end portions were exposed from the insulating coating 5*c* in an area of 800 $\mu$m×300 $\mu$m were used to constitute the recording electrode 5, as shown in FIG. 4. The electrode 5 served as an anode, and the ink transporting roll 1 served as a cathode. The recording electrode 5 was mounted in the ink tank 3 through silicone rubber 15, as shown in FIG. 10. At the same time, an angle $\theta$ formed between the recording electrode 5 and a normal to the ink transporting roll 1 was set to be 60°, and the distance d1 between the ink transporting roll 1 and the recording electrode 5 was changed as follows. Experimental results are summarized in the following table:

| d1 | State of Image |
|---|---|
| 0 mm | Slightly irregular with some transfer omissions |
| 0.5 mm | Good |
| 1.0 mm | Good |
| 1.5 mm | Good |
| 2.0 mm | Slightly irregular |
| 2.2 mm | Irregular with ink accumulation in contact portion with intermediate transfer roll |
| 2.5 mm | Irregular with ink accumulation in contact portion with intermediate transfer roll |

As described above, even if the distance d1 is set to be 0 mm, a satisfactory result cannot be obtained. However, the ink 2 is brought into contact with the intermediate transfer roll 6 because the recording electrode 5 is shifted by the transporting force of the ink 2 so that the distance d1 is not actually set to be 0 mm.

When a conventional thermal head was used in place of the recording electrode 5 and the viscosity of the fluid ink 2 was selectively decreased, images as in the above results could be obtained.

Experiment 2

A fluid ink 2 contained the following components:

| | parts by weight |
|---|---|
| Components A: | |
| Water | 100 |
| Polyvinyl alcohol PVA203 available from KURARAY CO., LTD. (polymerization degree: about 300; sponification degree: 88%) | 9 |
| Blue dye available from Orient Kagaku Kogyo | 3.6 |
| Colloidal silica RA200-5 available from Nippon Aerogel Corp. | 12 |
| Component B: | |
| Borax (decahydrate) $Na_2B_4O_7\ 10H_2O$ | 1 |

A fluid ink was prepared following the same procedures as in Experiment 1.

Collidal silica is a viscoelastic modifier. If this is not contained in the ink, plasticity of the ink 2 becomes high. The recording apparatus having a 40-mm diameter rotary roll 14 shown in FIG. 15 was used to stabilize coating of the ink 2. The relationship between the distances d1 and d2 was changed and recording was performed using the above recording apparatus. The resultant images were identical with those in Experiment 1.

The distances d1 and d2 were set to be d1=1.5 mm and d2=2 mm, an angle $\theta$ of a mounting plate 5*d* (bonderized steel plate having a thickness t=1 mm) of the recording electrode was changed, and an angle θ of the recording electrode 5 with respect to a normal to the ink transporting roll 1 was changed. Recording was performed under the above conditions, and the resultant images are summarized as follows:

| θ | State of Image |
|---|---|
| −5° | Irregular |
| 0° | Slightly irregular |
| 30° | Good |
| 60° | Good |
| 90° | Good |
| 95° | No image formed |

If $\theta<0°$, then irregularity occurred on the ink surface coated on the ink transporting roll 1. However, if $\theta>90°$, then the ink 2 could not be sufficiently brought into contact with the distal end of the recording electrode 5. When the angle θ was taken into further consideration, the best image could be obtained in the angle range of 50° to 60°.

Although the precise mechanism for the best angle range is not clearly understood, it is assumed that the ink layer strain caused by the stress acting on the ink layer by the recording electrode 5 coincides with the actual strain in the angle range of 50° to 60°, and that the stress in FIG. 12 is formed into a relatively regular stress pulse.

Experiment 3

In the apparatus in Experiment 2, the distance d2 between the ink transporting roll 1 and the intermediate transfer roll 6 is set to be d2=2.0 mm, the angle θ was set to be θ=60°, and a thickness t of the mounting plate 5*d* made of a bonderized steel plate was changed. Under these conditions, when the thickness t is 3 mm or more and the distance d1 between the ink transporting roll 1 and the recording electrode 5 was set to be as very small as 0 to 0.5 mm, the ink 2 was accumulated at the portion of the recording electrode 5 due to high rigidity of the mounting plate 5*d*. As a result, the ink layer was not often brought into contact with the intermediate transfer roll 6.

In this case, when the recording electrode 5 was moved to reset the distance d1 to be 1 to 2 mm, the ink 2 was no longer accumulated in the portion of the recording electrode 5. The ink layer was properly brought into contact with the intermediate transfer roll 6. Therefore, a good image could be obtained.

An experiment as in Experiment 2 was conducted using a fluid ink 2 having the following components.

| Components | parts by weight |
|---|---|
| Water | 100 |
| Guar gum (Emko Gum CSAA available from MEYHALL Corp, Switzerland) | 1 |
| Sodium borate (decahydrate) | 0.05 |
| Toner particles (particle size: 10 μm) prepared by uniformly dispersing phthalocyanine pigment in polyester resin (NP color copying machine cyan toner available from CANON INC.) | 50 |

Since the fluid ink 2 having the above components has a low viscosity, it has a force for urging the recording electrode 5. Therefore, it was suitable that the rigidity of the mounting plate 5*d* was not set so high, and its thickness was set to be 2 mm or less.

When the thickness of the ink layer is set to be 2 mm and the distance d1 between the ink transporting roll 1 and the recording electrode 5 is set to be, e.g., 0.5 mm, the ink 2 is supposed to be accumulated at the recording electrode portion. However, if the mounting plate 5*d* has a spring property, the recording electrode 5 is urged against the urging force of the ink 2. In practice, the distance d1 is set to be about 1.5 mm, and the ink 2 is not accumulated in the recording electrode portion. Judging from the above consideration, when the recording electrode 5 is mounted using the mounting plate 5*d* having a spring property, the ink 2 is not accumulated even if the distance d1 is set to be 0 mm.

In the above embodiment as described above, predetermined energy is applied to the fluid ink to form an ink image. Unlike in the conventional case, an ink ribbon having a solid ink layer can be omitted, thus allowing recording at low running cost.

When electrical energization is used to apply energy to the ink, the amount of energization can be reduced to about 1/10 as compared with thermal transfer recording using a conventional thermal head. Therefore, the running cost could be further reduced from the viewpoint of energy consumption.

Moreover, when the ink transporting means, the energy applying means, and the transfer medium are arranged in a predetermined positional relationship, a good image can be obtained.

Still another embodiment of the present invention will be described with reference to FIGS. 18 to 25.

This embodiment exemplifies a recording apparatus including a mixing roll 27. An ink 2 which has not been transferred to an intermediate transfer roll 6 is recovered in an ink tank 23 upon rotation of an ink transporting roll 1. The recovered ink can be stirred or mixed by a mixing roll 27 and is used again.

The mixing roll or means 27 will be described below. The mixing roll 27 is located in the downstream of the constant position between the ink 2 and the intermediate transfer roll 1 with respect to the rotational direction of the ink transporting roll 1. The roll 27 can be rotated in a direction of an arrow E (FIG. 18) (counterclockwise) to constitute the mixing means. The mixing means receives energy. Of the ink 2 components whose crosslinked structures are destroyed, the ink 2 which has not been transferred to the intermediate transfer roll 6 is mixed to accelerate recovery of the crosslinked structure. In this manner, the ink 2 can restore fluidity with adherence.

Energy is applied from the recording electrode 5 to the ink 2, and, for example, the crosslinked structure of the ink 2 is destroyed so that adherence is given to the ink. An ink image 2*a* with adherence is transferred to and developed by the intermediate transfer roll 6. If this transfer/development is not satisfactory, the non-developed ink, i.e., the residual ink 2 restores fluidity without adherence due to recovery of the crosslinked structure. However, the recovery phenomenon requires a certain period of time. If the recording speed is high, i.e., the speed of the ink transporting roll 1 is high, the ink reaches the contact position with the intermediate transfer roll 6 upon rotation of the ink transporting roll 1 prior to recovery of the crosslinked structure of the ink 2. This component may be undesirably developed as a ghost on the intermediate transfer roll 6.

In this case, when the ink 2 is stirred or mixed by the mixing roll 27 rotated in direction opposite to the rotational direction of the ink transporting roll 1, ions in the ink are diffused to accelerate recovery of the crosslinked structure. A difference between the pH of the residual ink and that of the ink which has not received energy is reduced. Therefore, the ink can immediately restore the initial fluidity without adherence.

Similarly, of the ink 2 components transported by the ink transporting roll 1, the ink component which has not received energy and part 2*a'* of the ink 2*a* component which has received energy are transported without being transferred to the intermediate transfer roll 6 in the direction of the arrow A. These transported ink components are stirred or mixed by the mixing roll 27. For example, restoration of the crosslinked structure destroyed upon application of the energy can be accelerated, and the ink having the restored crosslinked structure can be reused prior to the retransportation by the ink transporting roll 1.

More specifically, when an image is formed upon application of thermal energy, the residual ink which has not been transferred to the intermediate transfer roll 6 can restore the crosslinked structure by cooling. The residual ink is mixed by the mixing means or roll 27, the residual ink sol is brought into contact with other ink gel particles, thereby accelerating the restoration of the crosslinked structure.

In the above embodiment, the blade member is used as the layer thickness regulating means. However, in place of the blade member, a rotary roll may be used and spaced apart by a predetermined distance from the ink transporting roll 1, thereby constituting the layer thickness regulating means. According to the finding of the present inventor, when an ink was coated by using such a rotary roll, the thickness of the ink layer coated on the ink transporting roll 1 was often smaller than the distance between the rotary roll and the ink transporting roll 1 at a high speed (e.g., a peripheral velocity of 50 mm/s or more) of the ink transporting roll 1. In this case, the distance is preferably set to be larger than the thickness of the ink layer to be coated on the ink transporting roll 1.

In the above embodiment, a current is supplied from the recording electrode 5 to the ink transporting roll 1 through the ink 2. However, a current may be supplied across an array of the electrode elements 5*b*. In this case, an electrochemical change in the ink 2 upon energization causes formation of an ink surface portion having a high pH and an ink surface portion having a low pH adjacent thereto. Therefore, only the surface layer of the ink layer can be stirred or mixed by the mixing means 27.

Figure 21:
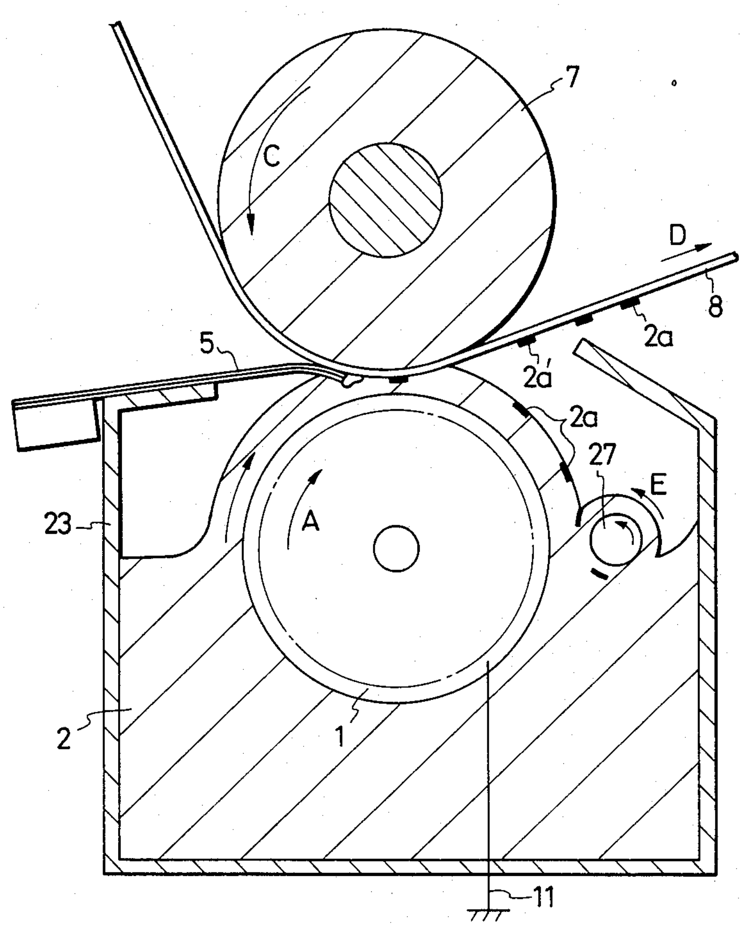
FIG. 21 is a view for explaining an arrangement in which an intermediate transfer roll is not included.

As shown in FIG. 21, without arranging the intermediate transfer medium, the ink image may be directly transferred from the ink transporting roll 1 to the recording sheet 8.

Figure 22:
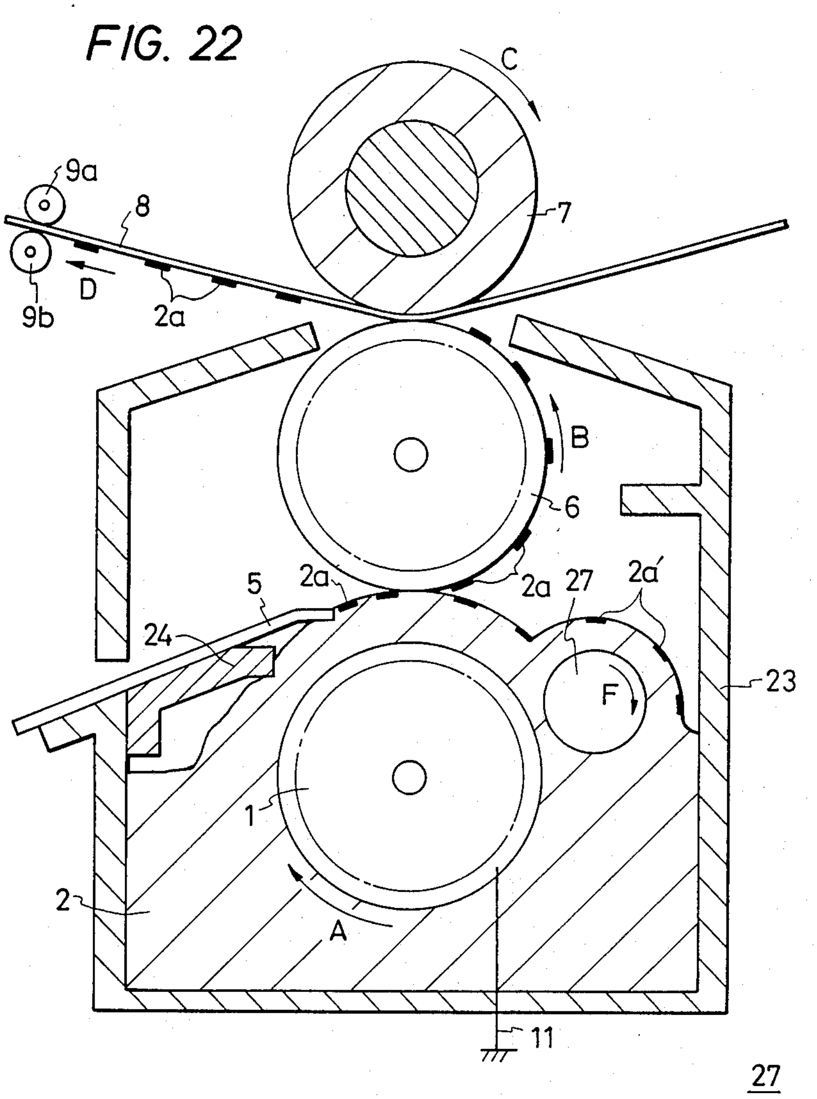
FIGS. 22 and 23 are views showing other arrangements of the mixing means.

In the above embodiment, the mixing roll 27 is rotated to mix the ink 2 which has been transported by the ink transporting roll 1. However, the mixing roll 27 may be rotated in a direction of an arrow F (clockwise) to mix the ink while the entire ink layer on the ink transporting roll 1 is separated from the ink transporting roll 1, as shown in FIG. 22.

Figure 23:
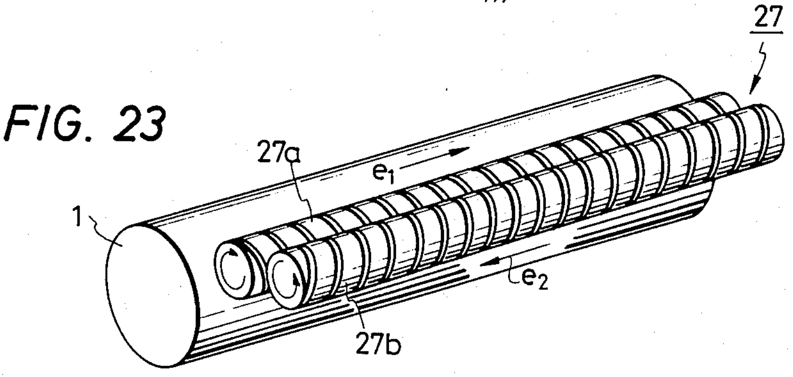

As shown in FIG. 23, a pair of rolls 27*a* and 27*b* having helical projections may be combined and rotated to mix the ink along the helical projections, as indicated by arrows e1 and e2, thereby improving the mixing effect.

In each of the embodiments described above, the mixing roll is rotated. However, the mixing roll need not be rotated. Therefore, the shape of the mixing means need not be a roll-like shape but may be a rod-like shape. In addition, the wall surface of the ink tank 3 may be used as a mixing means.

No problem occurs even if normal paper is used, so that the type of paper is not limited to a specific one.

(Experimental Results)

Experimental results of recording using the recording apparatus described above will be described below.

Experiment 1

Figure 18:
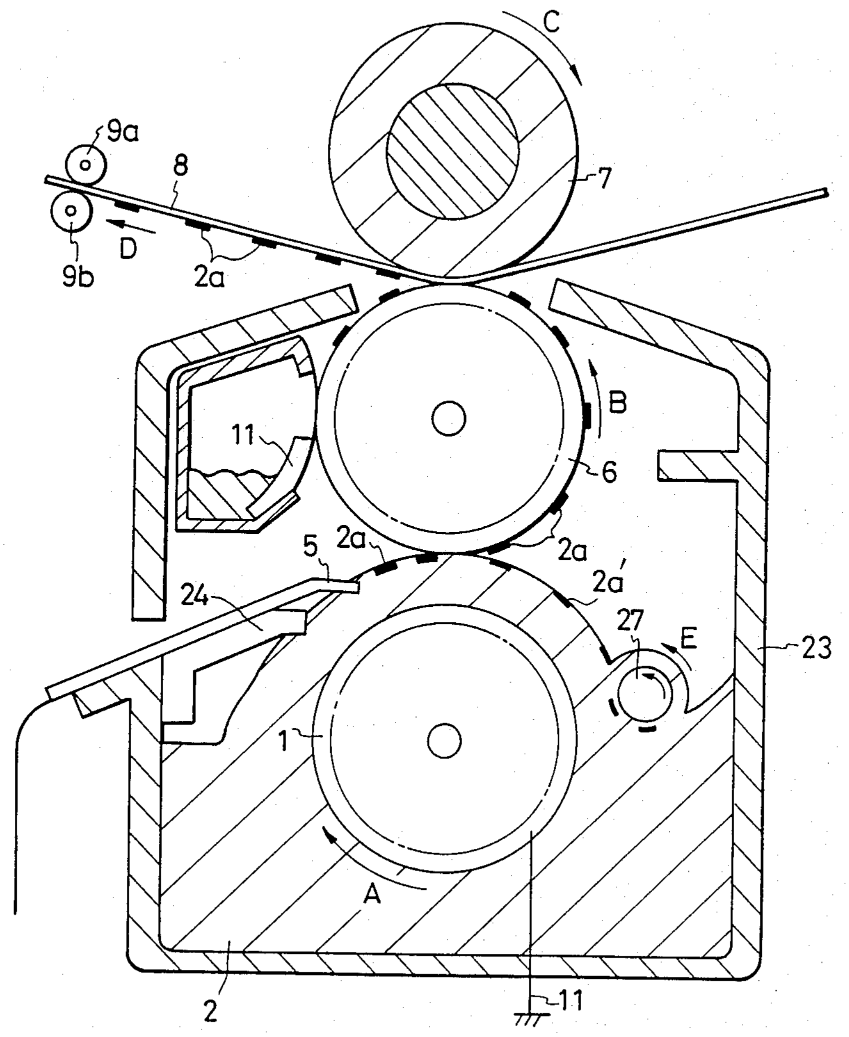
FIG. 18 is a view of a recording apparatus according to still another embodiment of the present invention.
Figure 20:
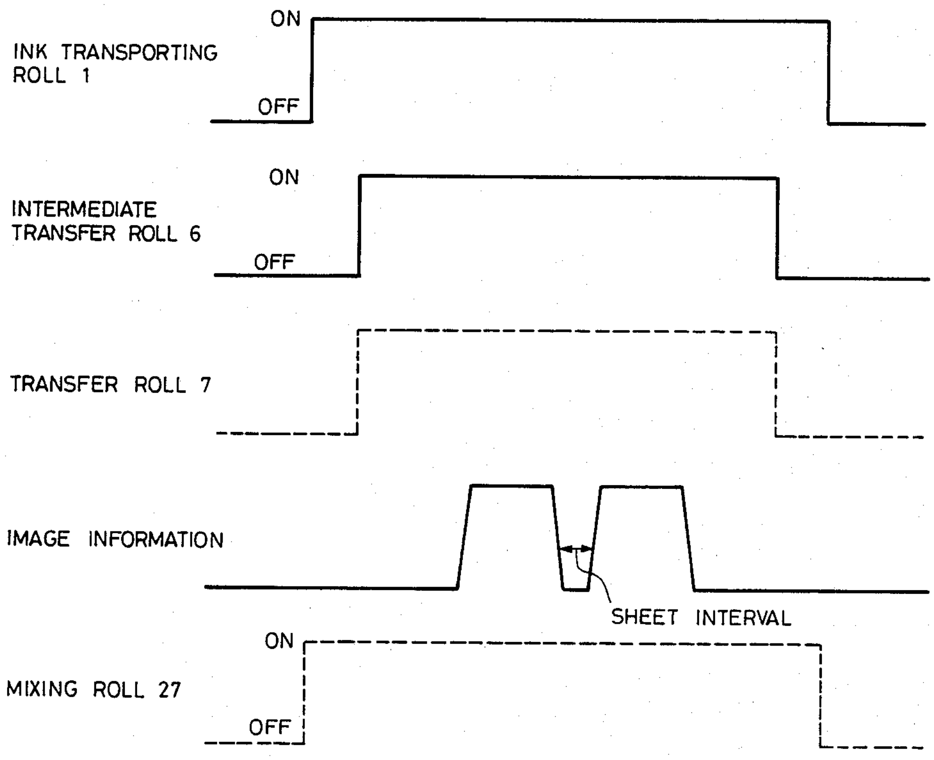
FIG. 20 is a timing chart for driving the recording apparatus shown in FIG. 18.

Recording was performed using the recording apparatus shown in FIG. 18.

A fluid ink 2 had the following components:

| | parts by weight |
|---|---|
| Components A: | |
| Water | 100 |
| Guar gum | 1 |
| Sodium borate (decahydrate) | 0.05 |
| Component B: | |
| 10- μm toner particles (NP color copying machine cyan toner available from CANON INC.) | 50 |

The components A were mixed and heated to obtain an amorphous gel having an excellent water-retaining property. The pH of the resultant gel is preferably adjusted by a suitable acid or alkali to be 7 to 11. The gel can be obtained by crosslinking Cis-positioned OH groups of $C_2$ and $C_3$ of a mannose backbone chain and Cis-positioned OH groups of $C_3$ and $C_4$ of a galactose side chain of guar gum by borate ions.

An acid such as hydrochloric acid or acetic acid is added to the components A to reduce the pH to be 7 or less, thereby easily destroying the gel structure and hence obtaining a viscous solution. 50 parts by weight of 10-μm toner particles as the component B are added and mixed, and the pH of the resultant solution is adjusted to 7 to 11, thereby preparing a sludge-like gel.

The ink transporting roll 1 was a 20-mm diameter stainless roll having surface roughness of 1S. The intermediate transfer roll 6 comprises a 20-mm diameter iron roll plated with hard chromium. The distance between the intermediate transfer roll 6 and the ink transporting roll 1 was set to be 2 mm.

The transfer roll 7 comprises a 12-mm diameter iron roll with a silicone rubber layer having a thickness of 4 mm. The transfer roll 7 was urged against the intermediate transfer roll 6 with a force of 1 kgf/cm and was rotated at the same speed as that of the intermediate transfer roll 6.

With the above arrangement, the intermediate transfer roll 6 was rotated at about 50 rpm and the ink transporting roll 1 was rotated at about 60 rpm. The ink 2 was coated on the surface of the ink transporting roll 1 to form an ink layer having a thickness of 2.5 mm. The ink layer was not transferred to the intermediate transfer roll 6 except for a small amount of water during application of the energy.

The electrode elements 5*b* whose distal end portions were exposed in an area of 100 μm×100 μm were used to constitute the recording electrode 5, as shown in FIG. 4. The electrode 5 served as an anode, and the ink transporting roll 1 served as a cathode. 500-μs pulses having a voltage of 40 V were applied to between the electrode 5 and the ink transporting roll 1 through the ink 2, as shown in FIG. 11. A current of about 2.5 mA flowed per electrode element 5*b*. Therefore, a clear image of 100 μm×150 μm was obtained at pitches of 500 μm. This is because the crosslinked structure of guar gum was destroyed by the above-mentioned energization.

When 10-μm toner was used as the particle component of the ink 2, satisfactory fixing could not be obtained. For this reason, after the image was transferred to the recording sheet 8, the sheet was heated to 180° C., thereby achieving satisfactory fixing.

In order to perform the above-mentioned recording, when the mixing roll 27 shown in FIG. 18 was omitted, a slight ghost image was formed at a position spaced by one revolution of the ink transporting roll 1.

When a 5-mm diameter stainless rod is arranged as the mixing means 27, formation of the ghost image can be greatly prevented. In addition, when the stainless rod is rotated at 100 rpm in the direction of the arrow E in FIG. 18, the ghost image can be substantially eliminated.

Experiment 2

When a large number of sheets were recorded in Experiment 1, the ink viscosity at a portion with a large amount of continuous image was different from that at a portion with a small amount of continuous image, thus causing slight image formation condition errors. As shown in FIG. 22, when a 16-mm diameter stainless rod was used as the mixing roll 27 and was rotated at 90 rpm in a direction of an arrow F, most of the ink on the ink transporting roll 1 was transferred to the mixing roll 27, and the ink layer as a whole could be sufficiently mixed, thereby preventing the above undesirable phenomenon.

When the helical mixing rolls 27*a* and 27*b* shown in FIG. 23 were used, the mixing effect was further improved.

Experiment 3

Figure 24:
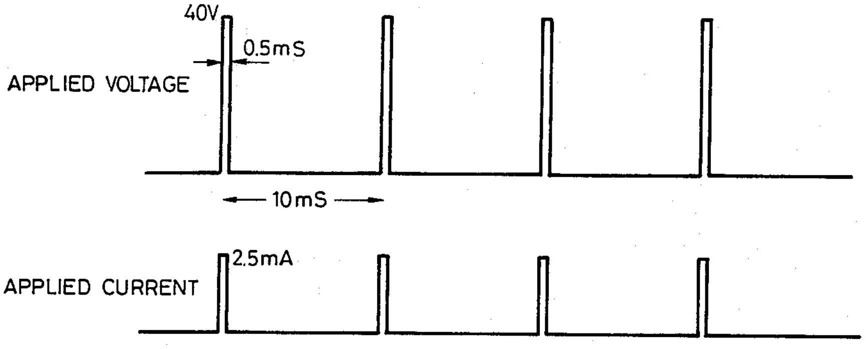
FIGS. 24 and 25 are timing charts showing applied signal pulses.
Figure 25:
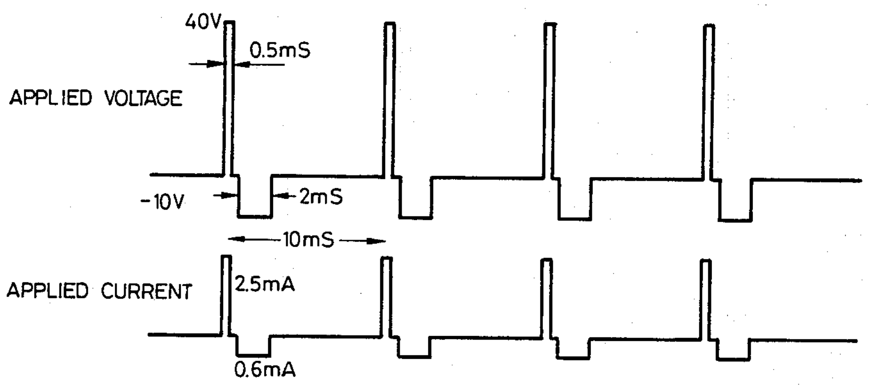

When the pulse shown in FIG. 24 was changed to the pulse shown in FIG. 25 in Experiment 1 and a large number of sheets were recorded, a nonuniform viscosity distribution rarely occurred in different sheets due to the following reason.

A portion having a high pH was formed upon application of a signal having the − direction so as to be contiguous with a sol portion whose pH was low and crosslinked structure was destroyed upon application of a signal having the + direction. Therefore, restoration of the crosslinked structure could be immediately performed by mixing only the surface layer of the ink layer.

According to this embodiment as described above, when the mixing means is further arranged to prevent formation of a ghost image or trailing in the recorded image, thereby providing a high-quality recorded image.

Still another embodiment of the present invention will be described with reference to FIGS. 26 to 29.

This embodiment exemplifies a recording head which is applicable to the previous embodiments. A plurality of electrodes are formed on a substrate, a protective layer made of a material having an electrical resistance is formed on the electrodes to constitute the recording head. By using such a recording head, electrical energy is selectively applied to the fluid ink, and the ink whose transfer characteristics have been changed is transferred to a transfer medium.

According to this embodiment, the electrodes are protected by the protective layer made of a material having an electrical resistance, and elution or the like of the electrodes can be prevented. When electrical energy is selectively applied to the fluid ink by using the above recording head, an ink image corresponding to the application of the energy can be formed, and the resultant ink image is transferred to the recording medium, thereby performing predetermined image recording.

The recording head will be described in detail below.

An ink transporting roll 1 was grounded through a ground line 10, and electrical energy is applied to the ink 2 interposed between a recording head 5 (anode) and the ink transporting roll 1 (cathode).

The recording head 25 is arranged as follows. A plurality of stripe-like recording electrodes 25*b* made of a conductive material (e.g., copper, aluminum, or gold) are formed on a substrate 25*a* made of a material (e.g., plastic, glass, or ceramic), and energization pulses can be selectively applied to the recording electrodes 25*b* by a control means (to be described later). A protective layer 25*c* having a volume resistivity of 10 to $10^6$ Ωcm is formed to entirely cover the recording electrodes 25*b*. An insulating layer 25*d* having a volume resistivity of at least $10^6$ Ωcm or more and made of a polyimide, ethylene tetrafluoride, polyethylene, polyester, dry film or the like is formed on the protective layer 25*c* except for the distal end portions of the recording electrodes 25*b*.

A material for forming the protective layer 25*c* having a predetermined volume resistivity is selected in favor of electrochemical stability. Examples of such a material are a metal (e.g., carbon, silver, tantalum, silicon, gold, iridium, platinum, rhodium, ruthenium, palladium, osmium, selenium, tellurium, bismuth, antimony, gallium, tin, and titanium); a metal oxide or nitride thereof; and a conductive polymer (e.g., polyacetylene, polythiophene, polypyrrole, polythiazyl, and polyparaphenyl).

It is difficult to form a film of such a metal. In this case, metal particles are disposed in a polymer or the like to form a polymer film having conductivity. Alternatively, a conductive film may be formed by baking a paste prepared by mixing a metal powder with an inorganic material such as so-called glass frit.

When the recording head 25 is driven (to be described later), the polymer prevents heating of the protective layer 25*c* as little as negligible. Therefore, the heat resistance is not required for the polymer if it has good mechanical stability such as anti-wear resistance.

The thickness of the protective layer 25*c* falls within the range of 1 to 100 μm in order to minimize formation of pinholes or the like and protect the recording electrodes 25*b*, and more preferably within the range of 1 to 20 μm. If the thickness is 1 μm or less, protection of the recording electrodes 25*b* is degraded. However, if the thickness exceeds 100 μm or more, energization from the recording electrodes 25*b* to the ink 2 is undesirably degraded. In practice, if the thickness of the protective layer 25*c* is set to be 1 mm, a voltage which is ½ or less of the voltage applied to the recording electrodes 25*b* is applied to the ink 2.

The volume resistivity of the protective layer 25*c* preferably falls within the range of 10 to $10^6$ Ωcm and more preferably 10 to $10^4$ Ωcm since the volume resistivity of the ink 2 is determined by ionic conduction.

The relationship between the volume resistivities of the protective layer 25*c* of the recording head 25 and the ink 2 will be described below. The volume resistivity of the protective layer 25*c* is preferably at least $10^{-2}$ to $10^3$ times that of the ink 2 and more preferably $10^{-1}$ to $10^2$ times.

The volume resistivities of both the protective layer 25*c* and the ink 2 satisfy the above range, a flow (arrows in FIG. 27A) of a current I from the recording electrodes 25*b* is slightly spread, as compared with the case wherein the protective layer 25*c* is not formed. However, if the thickness of the protective layer 25*c* is sufficiently smaller than that of the layer of the ink 2 (e.g., the thickness of the protective layer is 1 to 100 μm while the thickness of the ink layer is 0.1 to 5 mm), the ink image 2*a* is formed by the ink 2 in accordance with the width of each recording electrode 25*b*.

When the resistivities satisfy the above range, Joule heat of the protective layer 25*c* is very small upon energization of the recording electrodes 25*b*. Therefore, the temperature rise of the ink 2 is 1° C. or less, and no problem is posed.

Figure 27A:
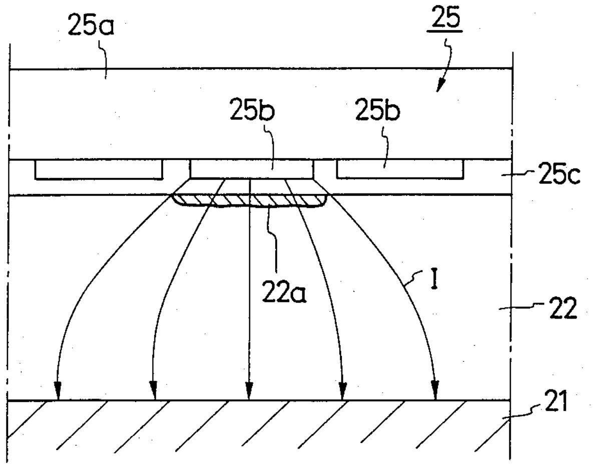
FIGS. 27A to 27C are views for explaining states of energization according to volume resistivity of a protective layer.
Figure 27B:
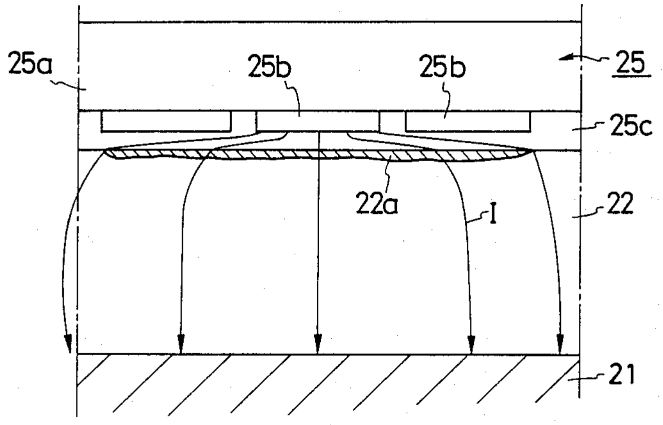
Figure 27C:
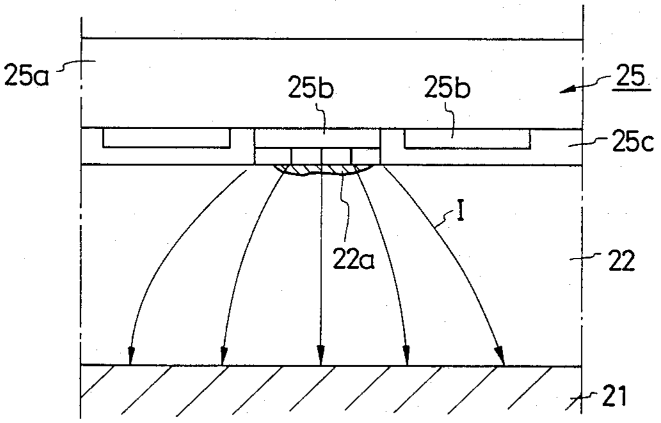

If the volume resistivity of the protective layer 25*c* is $10^{-2}$ times or less that of the ink 2, the protective layer 25*c* serves as an equipotential surface. In this case, as shown in FIG. 27B, the current is spread from the recording electrodes 25*b*, and an image may blur. In the worst case, the current I is not supplied to the ink transporting roll 1. For this reason, the protective layer 25*c* must be divided into a plurality of regions corresponding to the recording electrodes 25*b*, thus complicating the arrangement.

If the volume resistivity of the protective layer 25*c* is $10^3$ times or more that of the ink 2, a voltage applied to the ink 2 is undesirably lowered unless the thickness of the protective layer 25*c* is smaller than that of the ink 2.

The above quantitative description will be qualitatively made within the range of limited numerical values. A signal voltage Vs applied to the ink layer is given as follows if the resistances of the electrodes 25*b* are neglected:

$$Vs = V/\{1+(t/d)\cdot(x/r)\}$$

where V is the voltage applied from a driver, a is the width of the electrodes 25*b*, b is the space between the electrodes 25*b*, c is the thickness of the electrodes, t is the thickness of the protective layer 25*c*, x is the volume resistivity of the protective layer 25*c*, d is the thickness of the ink layer, and r is the volume resistivity of the ink 2.

A crosstalk voltage Vc applied to the ink layer through adjacent electrodes which are kept in a floating state is given by:

$$Vc = 1/\{1+(t/d+ab/cd)\cdot(x/r)\}$$

Figure 29A:
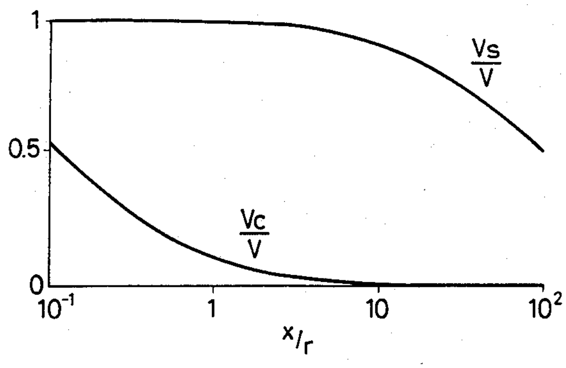
FIGS. 29A and 29B are graphs showing Vs/V - Vc/V as a function of x/r.

More specifically, the following conditions are given in FIG. 29A: a=800 μm; b=200 μm; c=16 μm; t=10 μm; and d=1 mm. Curves Vs/V and Vc/V as a function of x/r were plotted. In this case, if the ratio x/r falls within the range of 0.1 to 100, no problem occurs in both Vs and Vc.

Figure 29B:
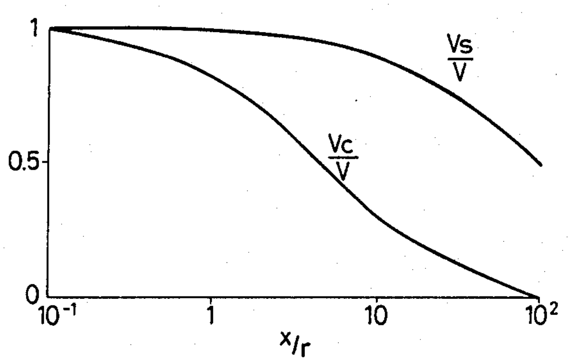

The conditions in FIG. 29B are given such that a=75 μm, b=25 μm, c=16 μm, t=10 μm, and d=1 mm. Curves Vs/V and Vc/V as a function of x/r were plotted. In this case, the ratio x/r preferably falls within the range of 10 to 100. The same values of Vs/V and Vc/V as a function of x/r as in FIG. 29A can be obtained for such a micropattern if the thickness c of the electrode and the thickness t of the protective layer are set to be 1/10 each.

When the width a of each electrode 25*b* and the space b between the adjacent electrodes 25*b* are large, the thickness c of the electrode and the thickness t of the protective layer 25*c* are set to be small, thereby increasing a possible operation range of the ratio x/r to be $10^{-2}$ to $10^3$.

More preferably, the adjacent electrodes (these electrodes do not receive a signal) constituting a micropattern should not be floated, but applied with an appropriate voltage, thereby preventing crosstalk between the disabled adjacent electrodes.

Figure 28A:
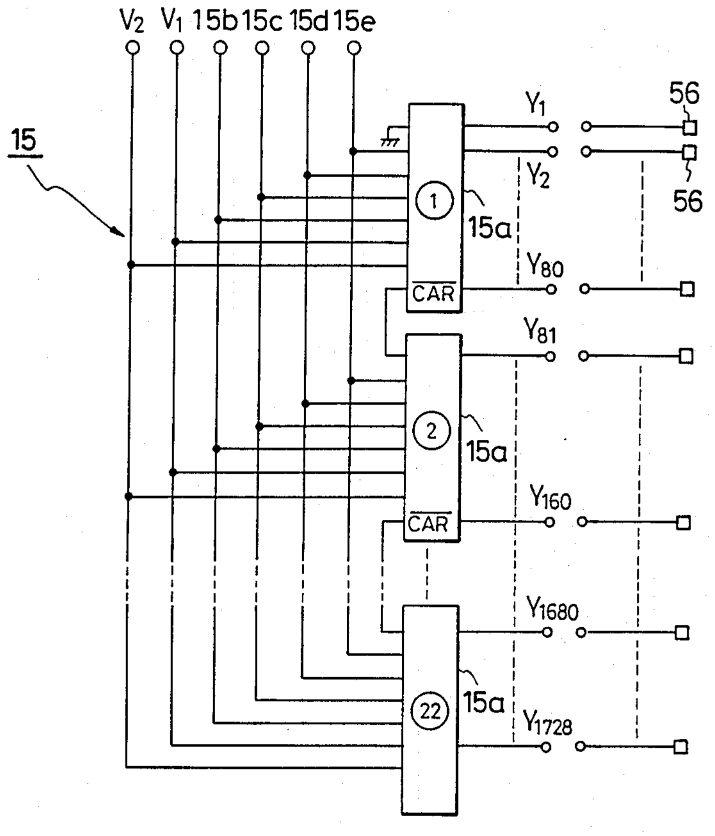
FIGS. 28A and 28B are views for explaining an arrangement of a recording head drive circuit.
Figure 28B:
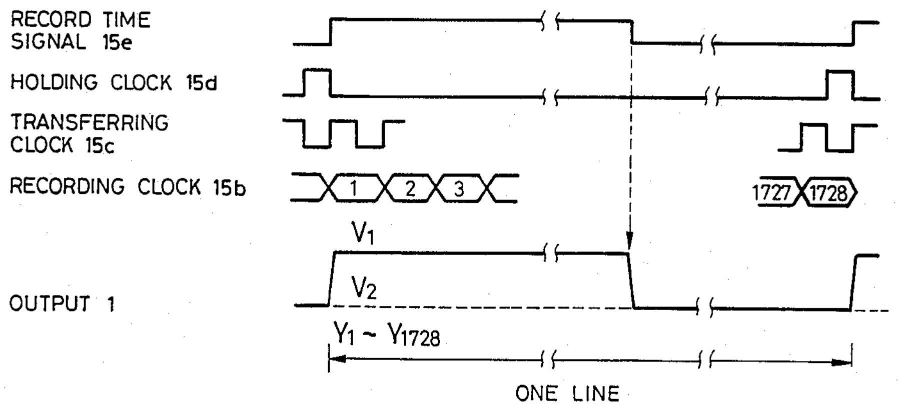

The control means for driving the recording head 25 is arranged, as shown in FIGS. 28A and 28B. FIG. 28A is a view for explaining a circuit arrangement of a control means 15, and FIG. 28B is a timing chart for explaining the operation of the control means 15.

Assume that recording is performed every 8 pels for a recording width of 216 mm in the above arrangement. An IC 15*a* in FIG. 28A drives 80 recording electrodes 25*b*. If the recording width of 216 mm is scanned, 22 ICs 15*a* must be used.

A recording signal 15*b* for selectively driving the recording electrodes 25*b* is input as series data from data lines, as shown in FIGS. 28A and 28B. The recording signal 15*b* is transferred to the corresponding driver in synchronism with a transfer clock 15*c*. The recording signal 15*b* is held by a holding clock 15*d* for a time required for one-line recording. When a record time signal 15*e* is set at high level, the recording electrodes 25*b* are set at a potential V1 or in a high-impedance state (the state represented by V2 in FIGS. 27A to 27C) in accordance with the recording signal 15*b*, thereby energizing the ink 2 in accordance with the recording signal 15*b*.

In the above embodiment, the protective layer 25*c* is formed to entirely cover the surface of the substrate 25*a* having stripe-like recording electrodes 25*b* thereon. However, the protective layer 25*c* may be formed on only the recording electrodes 25*b*.

Figure 26:
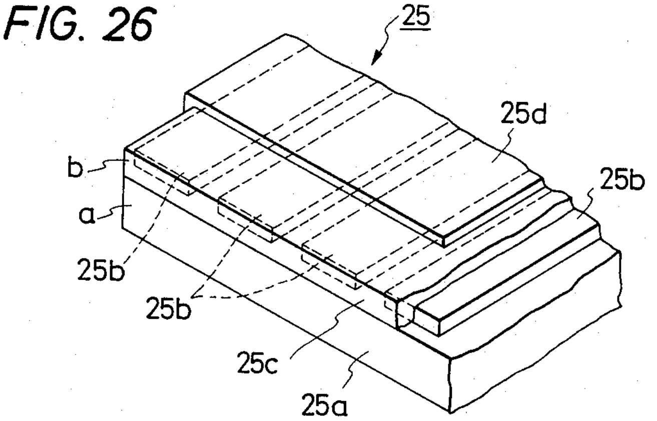
FIG. 26 is a view for explaining a recording electrode.

In the above embodiment, the insulating layer 25*d* is formed on the protective layer 25*c*, as shown in FIG. 26. In order to apply a voltage from the recording electrodes 25*b* to the ink 2, the insulating layer 25*d* shown in FIG. 26 need not be used.

In the above embodiment, in order to energize the ink 2, the voltage is applied from the recording electrodes 25*b* to the ink transporting roll 1 through the ink 2. However, a current may be supplied between the adjacent recording electrodes 25*b* constituting an array.

Furthermore, when a current corresponding to the image signal is supplied in the recording head 25 in one direction and a current is then supplied in the other direction, a nonimage portion whose pH is greatly changed in the other direction is formed next to the image portion whose pH is greatly changed and crosslinked structure is destroyed. Even if the ink which has received energy is not perfectly transferred to the intermediate transfer roll 6, the ink 2 can be mixed again in the ink tank 3, restoration of the crosslinked structure can be immediately performed by ion diffusion, thereby effectively preventing a ghost image.

(Experimental Results)

Experimental results of recording using the recording head 25 as a thermal head described above will be described below.

Experiment 1

Recording was performed using the recording head 25 shown in FIG. 26 and the recording apparatus (FIG. 18) without the mixing means 27.

Stripe-like recording electrodes **25*b* (electrode width: 75 μm; space between adjacent electrodes: 50 μm) of a copper pattern were formed on a 1.6-mm thick glass epoxy substrate 25*a* in order to prepare a recording head 25**.

Nickel was plated on the substrate **25*a* and the recording electrodes 25*b* to form a 2-μm thick nickel film. Rhodium was then plated on the nickel film to form a 0.3-μm thick rhodium film. A protective layer 25*c* was uniformly coated on the distal end portion of the recording head along a longitudinal direction thereof. The protective layer 25*c*** has a width of 0.2 mm and a thickness of 10 μm.

The protective layer **25*c*** had the following components:

| | |
|---|---|
| Soluble Nylon CM8000 available from TORAY INDUSTRIES INC. | 1.5 g |
| Carbon black available from Columbia Carbon | 0.6 g |
| Methanol | 10 cc |

The above components were well dispersed, and the mixture was coated with a bar coater. The resultant film was dries to prepare a protective layer **25*c*. In this case, the volume resistivity of the protective layer 25*c*** was about $10^3$ Ωcm.

A Teflon (tradename) tape with an adhesive available from Sumitomo 3M Co., Ltd. was used as the insulating layer **25*d* and was adhered except the 200-μm long distal end portion of the recording electrodes 25*b***.

A fluid ink 2 used in the recording apparatus had the following components:

| Components | parts by weight |
|---|---|
| Water | 100 |
| Polyvinyl alcohol PVA203 available from KURARAY CO., LTD. (polymerization degree: about 300, sponification degree: 88%) | 9 |
| Water Blue | 3.6 |
| Collidal silica RA200-5 available from Nippon Aerozyl Corp. | 12 |
| Borax (decahydrate) $Na_2B_4O_7.10H_2O$ | 0.6 |

The above components were mixed and heated. The resultant mixer was cooled to prepare the ink 2. The ink 2 was formed into a cubic body having a volume of 1 $cm^3$, and its volume resistivity was measured by a 1 cm×1 cm platinum electrode to be 80 Ωcm.

The ink transporting roll 1 was a 20-mm diameter stainless roll and had surface roughness of 1S. The intermediate transfer roll 6 was a 20-mm diameter iron roll plated with hard chromium. The distance between the intermediate transfer roll 6 and the ink transporting roll 1 was set to be 2 mm.

The transfer roll 8 was prepared such that a 4-mm thick silicone rubber layer was formed on a 12-mm diameter iron roll. The transfer roll 8 was urged against the intermediate transfer roll 6 with a force of 1 kgf/cm and was rotated at the same speed as that of the intermediate transfer roll 6.

With the above arrangement, when the intermediate transfer roll 6 was rotated at about 50 rpm and the ink transporting roll 1 was rotated at about 60 rpm. A 2-mm thick layer of the ink 2 was formed on the surface of the ink transporting roll 1. When energy was not applied to the ink 2, the ink was not transferred to the intermediate transfer roll 6 except for a small amount of water.

A 2-ms pulse signal having 10 V and 0.5 mA was applied for each picture element to the recording head 25 serving as the anode, recording was performed, and a good image could be formed.

In order to test durability of the recording head 25, a DC voltage of 20 V was continuously applied to the recording head 25 for an hour. However, no changes were found in the recording head 25.

Experiment 2

When the protective layer **25*c* was formed in Experiment 1, a good image could be obtained in the initial period of recording. However, after the durability test in Experiment 1 was completed, the distal end portions of the recording electrodes 25*b*** were melted, and good images could not be obtained due to the following reason.

Rhodium plating on the copper pattern in the recording head 25 may be properly functioned due to pinholes or the like.

Experiment 3

A protective layer **25*c* as in Experiment 1 was directly formed on the recording electrodes 25*b*** without the above-mentioned plated film. In this case, the same image and durability as in Experiment 1 could be obtained due to the following reason.

The protective layer **25*c*** may be properly functioned.

Experiment 4

A 5-μm thick protective layer **25*c* consisting of the following components was formed on recording electrodes 25*b*** having one pel (electrode width: 800 μm; space between adjacent electrodes: 200 μm):

| | |
|---|---|
| Soluble Nylon CM8000 available from TORAY INDUSTRIES INC. | 1.5 g |
| Carbon black available from Columbia Carbon | 0.3 g |
| Methanol | 10 cc |

The above components were dispersed well, and the resultant mixture was coated with a bar coater. A film was then dried and a protective layer **25*c* was formed. In this case, the volume resistivity of the protective layer 25*c*** was about $3\times10^4$ Ωcm.

A 2-ms voltage pulse having about 20 V and 4 mA was required every picture element, but the durability of this recording electrode was the same as that in Experiment 1.

Experiment 5

In Experiment 1, the thickness of the protective layer **25*c*** was set to be 2 μm, and its components were given as follows:

| | |
|---|---|
| Soluble Nylon CM8000 available from TORAY INDUSTRIES INC. | 1.5 g |
| $SnO_2$ powder T-1 available from MITSUBISHI METAL CORP. | 0.3 g |
| Methanol | 10 cc |

The volume resistivity was about $1\times10^6$ Ωcm.

Even if a voltage of 40 V was applied to the ink in Experiment 1, no changes in the ink 2 occurred. Therefore, the image could not be formed. For this reason, components of the fluid ink 2 were given as follows:

| Component | parts by weight |
|---|---|
| Water | 100 |
| Guar gum (Emuko Gum CASS (tradename) available from MEYHALL Corp., switzerland) | 1 |
| Sodium borate (decahydrate) | 0.05 |
| toner particles having 10-μm diameter which is prepared by uniformly dispersing phthalocyanine pigment in polyester resin (NP color copying machine cyan toner without a fluidity improving agent, available from CANON INC) | 50 |

The volume resistivity of the ink 2 was about 2 kΩcm. A pulse signal having a voltage of 40 V is applied to the ink 2 to perform recording. A good image could be obtained. The durability of the recording electrode 25*b* was tested following the same procedures as in Experiment 1. A good durability test result could be obtained.

Experiment 6

When the thickness of the protective layer 25*c* was set to be 0.5 μm in Experiment 5, some of the recording electrodes 25 were slightly melted in the durability test shown in Experiment 1 due to the influence of pinholes.

Experiment 7

When a 500-Å thick gold film was unformly deposited at the distal end portions of the electrodes 25*b* of the recording head 25 in Experiment 1, blurring occurred in the resultant image.

In this case, the resistivity of gold was unknown but may be supposed to be 1 Ωcm or less. Although bulk gold has a volume resistivity very smaller than 1 Ωcm, the gold film is assumed to have a relatively large resistivity since it is a thin film. However, durability was degraded as compared with 0.3-μm thick gold plating or rhodium plating on the copper electrode.

Experiment 8

A recording head 25 was arranged as follows. A paste containing 80 parts by weight of gold, 20 parts by weight of low-melting glass, and a balance of CuO and MnO was printed by screen printing on a 0.635-mm thick substrate 25*a* made of alumina, thereby forming a 4-μm thick film. This film was etched by a photolithographic process to obtain strip-like electrodes at pitches of 1.27 mm (electrode width: 1 mm; space between adjacent electrodes: 270 μm).

The resultant electrode pattern was baked, and a paste consisting of ruthenium oxide and low-melting glass was printed at the distal end portions (width: 1 mm) of the electrodes. The resultant film was baked to form the protective layer 25*c*.

The thickness of the ruthenium oxide was 6 μm, and its volume resistivity was $1\times10^3$ Ωcm.

A glass layer as the insulating layer 25*d* was formed on the ruthenium oxide layer except for the 0.8-mm long distal end portions of the electrodes.

Following the same procedures as in Experiment 1, image recording and a durability test were performed using this recording head 25. A good image could be obtained, and the recording head 25 had good durability.

When the recording head according to this embodiment is used, elution of the electrodes upon energization can be prevented because the protective layer is formed on the electrodes.

Still another embodiment of the present invention will be described with reference to FIGS. 30 to 36.

According to this embodiment, an ink portion supplied with a current in one direction is positionally followed by an ink portion supplied with a current in the other direction, thereby accelerating and repeating recovery of the fluid state of the ink without adherence.

A drive circuit for a recording electrode (recording head) used in this embodiment will be described below.

Figure 30:
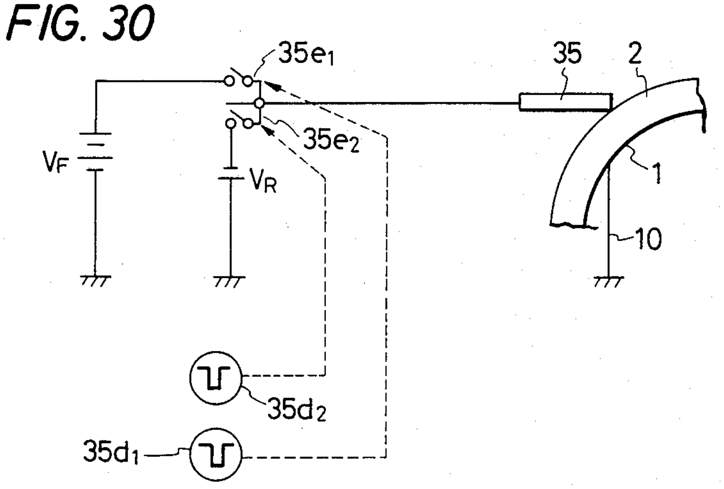
FIG. 30 is a view for explaining an arrangement for driving the recording electrode.

The drive circuit for the recording electrode 35 is illustrated in FIG. 30. A signal from a pulse generator 35*d*1 is applied through a CMOS analog switch 35*e*1, and a signal from a pulse generator 35*d*2 is then applied through a CMOS analog switch 35*e*2. The switches 35*e*1 and 35*e*2 are sequentially turned on to apply a current (voltage) pulse from a voltage source VF in one direction and then a current (voltage) from a voltage source VR in the other direction.

An amount of energization of the recording electrode 35 is enough to destroy a crosslinked structure and cause an electrochemical change if a crosslinked structure substance of the ink 2 is obtained by crosslinking guar gum with borate ions. Therefore, an amount of energization can be enough to cause the crosslinking agent in a very small amount of several hundreds of ppm to exchange electrons with the ink 2. As compared with the amount of energization obtained by applying thermal energy to the ink with a thermal head in a thermal transfer system or the like, an amount of energy can be reduced to about 1/10. Upon application of such energy, the ink 2 can have adherence.

A control mechanism using the drive circuit in the recording apparatus will be described below.

Figure 31:
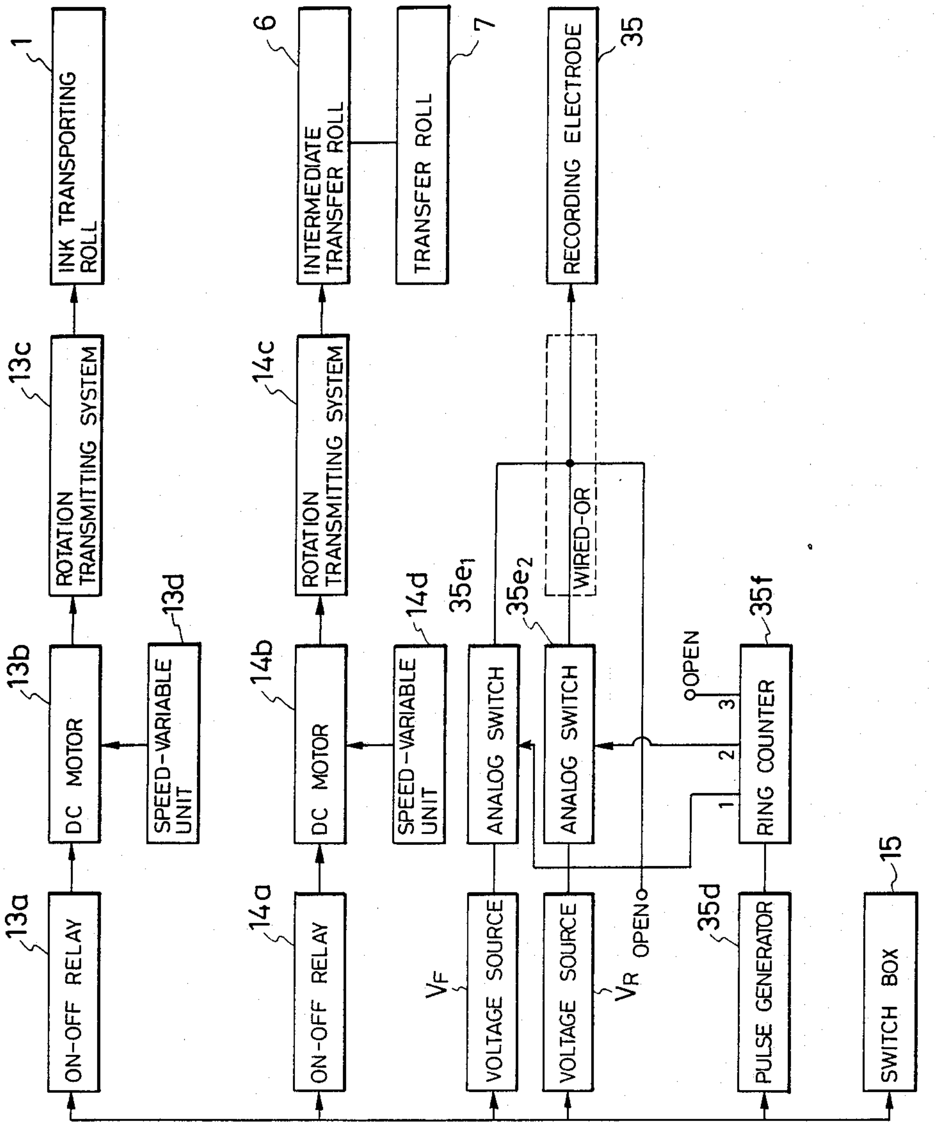
FIG. 31 is a block diagram of a control system.

As shown in the block diagram of FIG. 31, the ink transporting roll 1 and the intermediate transfer roll 6 are driven through rotary drive systems 13*c* and 14*c* by motors 13*b* and 14*b* whose on/off operations are controlled by relays 13*a* and 14*a*, respectively. The transfer roll 7 is driven upon rotation of the intermediate transfer roll 6. Speeds of the motors 13*b* and 14*b* can be variably changed by manual speed variable units 13*d* and 14*d*.

Signals supplied to the recording electrode 35 can be set by the voltage sources VF and VR. These outputs are wire-ORed to the recording electrode 35 through the corresponding CMOS analog switches 35*e*1 and 35*e*2. The analog switches 35*e*1 and 35*e*2 are controlled by a ring counter 35*f* synchronized with a pulse generator 35*d*.

In the arrangement of FIG. 31, when an output from the ring counter 35*f* is set to be "1" (i.e., the switch 35*e*1 is ON and the switch 35*e*2 is OFF), an output VF is obtained. When the output from the ring counter 35*f* is set to be "2" (i.e., the switch 35*e*1 is OFF and the switch 35e2 is ON), an output VR is obtained. When the output from the ring counter 35f is set to be "3" (i.e., both the switches 35e1 and 35e2 are OFF), an output 0 is obtained.

The above elements are controlled by a manual switch box 15.

Figure 32:
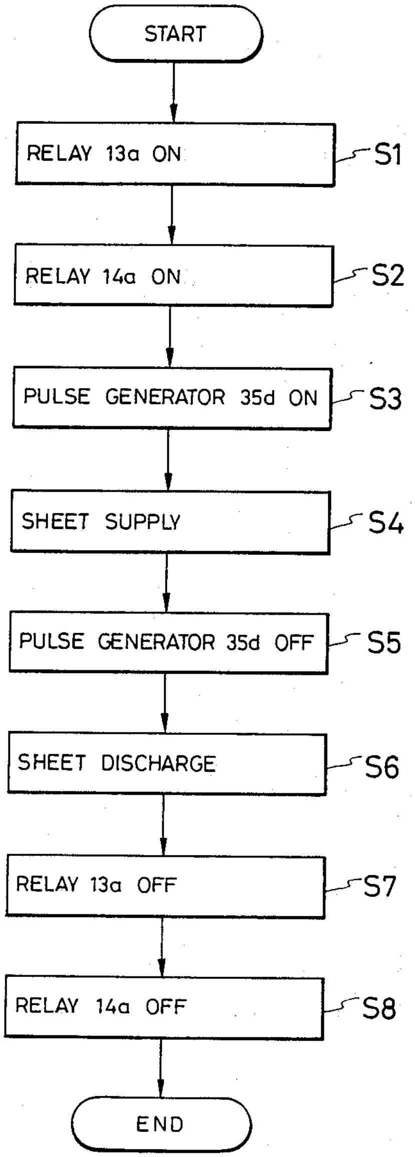
FIG. 32 is a flow chart for explaining the operation of the control system.

The operation of the control mechanism is shown in a flow chart of FIG. 32. The relays 13a and 14a are turned on (steps 1 and 2), and the ink transporting roll 1 and the intermediate transfer roll 6 are rotated. When the pulse generator 35d is turned on (step 3), the recording electrode 35 is driven. At the same time, the recording sheet 8 is supplied (step 4), and predetermined recording is performed. When recording is completed, the pulse generator 35d is turned off (step 5). At the same time, the recording sheet 8 is discharged (step 6), and the relays 13a and 14a are turned off (steps 7 and 8), thereby completing the recording operation.

When transfer/development is not satisfactory, the nondeveloped ink, i.e., the residual ink 2a' restores the crosslinked structure and is set in a fluid state without adherence. This restoration phenomenon requires a certain period of time. If a recording speed is high, i.e., the speed of the ink transporting roll 1 is high, the residual ink 2a reaches the contact portion with the intermediate transfer roll 6 upon rotation of the ink transporting roll 1 prior to restoration of the crosslinked structure. This residual ink may be developed as a ghost on the intermediate transfer roll 6.

Figure 8B:
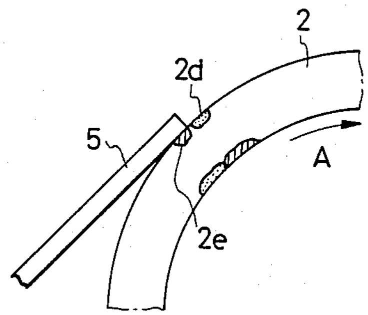

In this embodiment as described above, the current corresponding to the image signal is supplied to the recording electrode 35 in one direction and then a current is supplied thereto in the other direction. Therefore, as shown in FIG. 8B, the nonimage portion 2e whose pH is greatly changed in the other direction is formed next to the portion 2d having an image portion whose pH is greatly changed and its crosslinked structure is destroyed. Therefore, the ink 2a' is recovered in the ink tank 3 again upon rotation of the ink transporting roll 1. The ink 2a' is mixed by the wall surface or the like of the ink tank 3, and restoration of the fluid state without adherence can be immediately performed by ion diffusion. For this reason, even if the recording speed is high, the crosslinked structure can be completely restored and the ink 2' can be set in the initial fluid state without adherence prior to carrying of the ink 2a' onto the ink transporting roll 1, thereby preventing formation of a ghost. Furthermore, when energization is performed as described above, the recording apparatus can also prevent trailing of an image caused by the recording electrode 35 brought into contact with the image portion whose viscosity is decreased.

Assume that a value of a current supplied in one direction is defined as iF, its energization time is defined as tF, a value of a current in the other direction is defined as iR, and its energization time is defined as tR. An amount of energization change $QF = iF \cdot tF$ in one direction is preferably set to be equal to an amount of energization charge $QR = iR \cdot tR$. More specifically, condition $0.8QF < QR < 1.2QF$ is preferably established. With this condition, the restoration of the fluid state, i.e., restoration of the initial pH value can be effectively performed.

Figure 33:
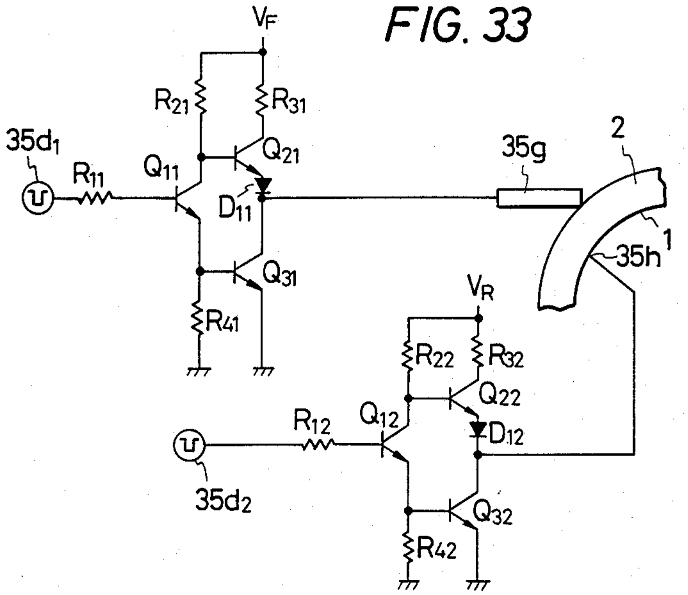
FIGS. 33 and 34 are views showing another energization arrangement.

In the above embodiment, the ink transporting roll 1 is grounded. However, a signal drive circuit may be arranged, as shown in FIG. 33. The recording electrode 35 serves as a signal electrode 35g, and the ink transporting roll 1 serves as a counter electrode 35h. Pulse signals may be supplied from pulse generators 35d1 and 35d2 to the electrodes 35g and 35h, respectively. In this manner, since a bias is applied to the counter electrode 35h, positive and negative signals need not be supplied to the recording electrode 35, as shown in FIG. 30.

An operation of the arrangement shown in FIG. 33 will be briefly described. When the pulse generator 35d1 is set at high level, a transistor element Q11 is turned on to enable an element Q31. However, a current is not supplied to the base of an element Q21 and the element Q21 is kept off. However, when the pulse generator 35d1 is set at low level, the elements Q11 and Q31 are kept off. A current is supplied to the base of the element Q31 through a resistor R21 and is then turned on. The operations of elements Q21, Q22, and Q32 in association with the pulse generator 35d2 are similarly performed.

When the pulse generator 35d1 is set at low level and the pulse generator 35d2 is set at high level, a current is supplied from the voltage source VF to a resistor R31, the element Q21, a diode D11, the signal electrode 35g, the ink 2, the counter electrode 35h, and the element Q32. When the pulse generator 35d1 is set at high level and the pulse generator 35d2 is set at low level, a current is supplied from a power source VR to a resistor R32, the element Q22, a diode D22, the counter electrode 35h, the ink 2, the signal electrode 35g, and the element Q31.

In the arrangement of FIG. 33, two pulse generators 35d1 and 35d2 are used. However, if a ring counter as shown in FIG. 31 is used, only one pulse generator can be used.

Figure 34:
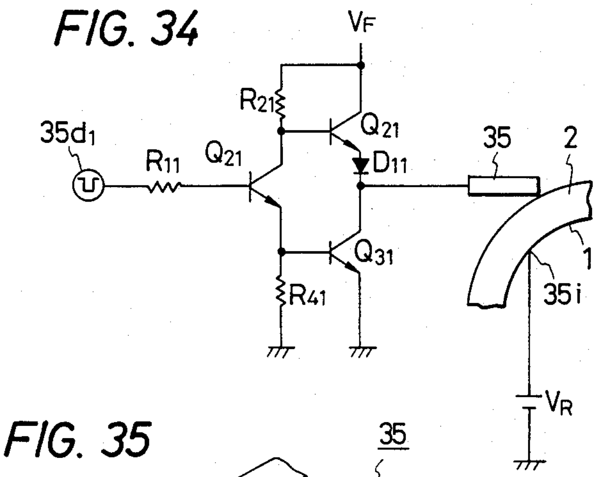

Another arrangement including a counter electrode is shown in FIG. 34. A DC bias VR corresponding to the time of the pulse signal applied to the recording electrode 35 may be applied to the ink transporting roll 1 in a direction opposite to the energization direction of the recording electrode 35. With this electrode, a drive circuit for a counter electrode 35i can be omitted.

As shown in FIG. 34, when the DC bias is applied, it must have a value which prevents an electrochemical reaction of the ink 2, e.g., generation of hydrogen gas or the like at, e.g., the cathode (the recording electrode 35 when the signal pulse is not supplied).

In the above embodiment, the voltage is applied from the recording electrode 35 to the ink transporting roll 1 through the ink 2. However, a current may be supplied between adjacent electrode elements 35b constituting an array. In this case, the electrochemical change of the ink 2 by energization allows to form an ink surface portion having a high pH and an ink surface portion having a low pH adjacent thereto. Therefore, only the surface layer of the ink layer in the ink tank 3 is mixed to effectively stir the ink as a whole.

Figure 35:
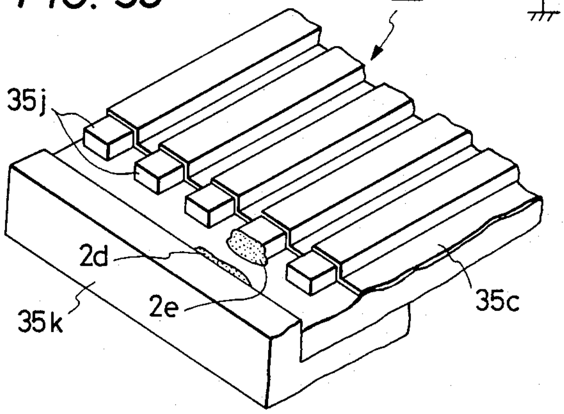
FIGS. 35 and 36 are views for explaining a reverse-biased signal pulse.

In particular, when the recording electrode 35 serves as an anode, the electrode is preferably plated or a noble metal electrode is preferably used in order to substantially prevent anode metal elution caused by the electrochemical reaction, as previously described. In this case, as shown in FIG. 35, a common electrode 35k may be spaced apart by a predetermined distance from a signal electrode 35j. The common electrode 35k may serve as the anode while the signal electrode 35j may serve as the cathode.

With the above arrangement, the common electrode 35k is preferably made of a noble metal pattern of platinum or the like, and the signal electrode 35 having a micropattern is preferably made of any metal.

In addition, the common electrode may be divided into a plurality of blocks. In this case, during driving of the signal and common electrodes, a matrix is preferably formed to reduce the number of drive elements and a total amount of current.

With the arrangement described above, when the current is supplied in one direction, a portion having a very low pH and a portion having a high pH are simultaneously formed in the ink 2. This is most preferable in favor of simplification of the drive circuit.

(Experimental Results)

Experimental results of recording using the recording apparatus (obtained by excluding the mixing means 27 from the arrangement in FIG. 18) employing control of the recording electrode 35 will be described below.

Experiment 1

Components of the fluid ink 2 were the same as those in Experiment 1 conducted using the recording apparatus shown in FIG. 18.

Figure 36:
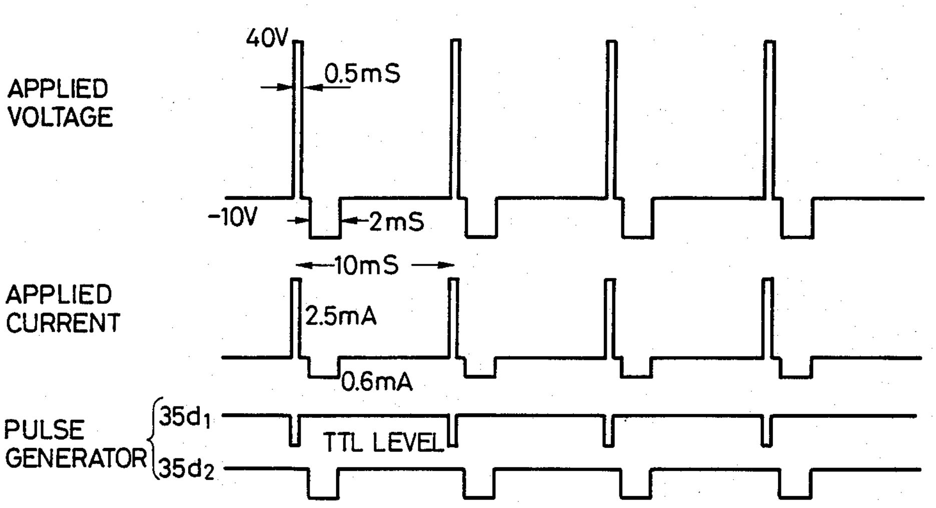

As shown in FIG. 36, an energization signal pulse having a voltage VF=40 and a pulse width tF=0.5 ms was applied in one direction, and then a signal pulse having a voltage VR=10 V and a pulse width tR=2 ms was applied in the other direction. In this case, no ghost image was formed.

When a large number of sheets were recorded, but no nonuniform distribution of ink viscosity occurred in the images due to the following reason. A portion having a high pH was formed next to the sol portion whose pH was low and crosslinked structure was destroyed upon application of a signal in the + direction. Therefore, restoration of the fluid state of the ink 2 could be immediately performed by mixing of only a surface layer of the ink. In this case, trailing of the image was reduced as small as 100 μm×120 μm.

Experiment 2

Using an ink 2 as in Experiment 1 and a drive circuit (FIG. 33) as an energy applying means 35, a pulse shown in FIG. 36 was applied following the same procedures as in Experiment 1. The same effects as in Experiment 1 could be obtained.

Experiment 3

Using an ink 2 as in Experiment 1 and a drive circuit (FIG. 34) as an energy applying means 35, a signal pulse having a voltage VF=40 V and a pulse width tF=0.5 ms was applied in one direction, and a DC bias VR=2 V was applied in correspondence with the signal applied time. In this case, no ghost or the like was formed.

In the arrangement wherein energy is applied by the drive circuit shown in FIG. 34, the value of the DC bias VR is preferably determined as a value which prevents generation of hydrogen gas or the like at the cathode. According to the experiment of the present inventor, preferable results were obtained when the value o the bias VR falled within the range of 0.1 V to 2 V and more preferably 0.3 V to 1 V.

As described above in detail, after a current pulse is supplied in one direction, a pulse is then applied in the other direction. Formation of a ghost image and trailing of the recorded image can be prevented, and a high-quality recorded image can be obtained.

Still another embodiment of the present invention will be described with reference to FIGS. 37 to 40.

In this embodiment, a recording head 45 comprises an electrode member, a drive member, and a connecting means for electrically connecting the electrode and the drive members. Elution of recording electrodes of the electrode member can be prevented, and replacement of only the electrode member worn by friction with the ink can be facilitated.

This embodiment also provides an image recording apparatus which can be easily maintained when the above recording head is used in an image recording apparatus.

The recording head 45 will be described in detail below. An ink transporting roll 1 is grounded through a ground line 10, and electrical energy is applied to an ink 2 interposed between the recording head 45 (anode) and the ink transporting roll 1 (cathode).

Figure 37A:
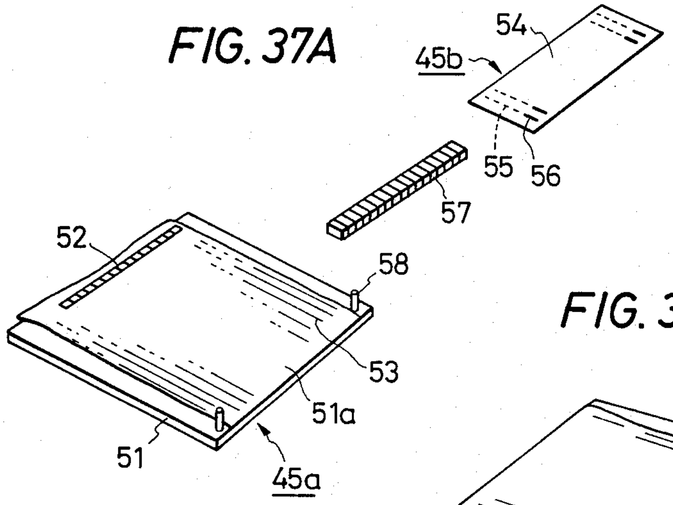
FIGS. 37A and 37B are views for explaining a recording head.
Figure 37B:
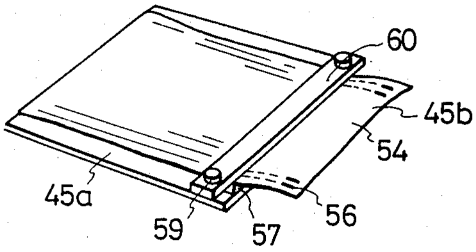

The recording head 45 comprises a drive member 45*a* and an electrode member 45*b*, as best illustrated in FIGS. 37A and 37B.

Referring to FIGS. 37A and 37B, a base 51 is made of glass epoxy, alumina, glass, or the like. Drive ICs (drivers ICHD611000A available from HITACHI LTD.) are mounted on the base 51 to selectively drive recording electrodes 56 and are driven by a control means (to be described later). Output lines 53 are formed at an end portion 51*a* of the base 51. In practice, eight output lines/mm are formed to constitute the drive member 45*a*.

A base 54 is made of glass epoxy or the like. Connecting lines 55 respectively corresponding to the output lines 53 are formed on the base 54. In practice, eight connecting lines/mm are formed. Linear recording electrodes 56 covered with carbon formed by a thick-film formation process are formed on the base 54 in one-to-one correspondence with the connecting lines, thereby constituting the electrode member 45*b*.

An anisotropic conductive rubber member (e.g., Shinetsu interconnector SSKTYPE available from Shinetsu Polymer K.K.) 57 electrically connects the drive member 45*a* and the electrode member 45*b*. Stud bolts 58 extend upright on the base 51 and correspond to nuts 59, respectively. The bolts 58 are tightened by the nuts 59 through a pressure member 60.

As shown in FIG. 37B, the anisotropic conductive rubber member 57 is clamped between the drive member 45*a* and the electrode member 45*b*. The pressure member 60 is mounted above the electrode member 45*b* through the stud bolts 58 and is fastened by the nuts 59. Therefore, the anisotropic conductive rubber member 57 electrically connects the drive member 45*a* and the electrode member 45*b*.

When the recording electrodes 56 in the recording head 45 having the arrangement as described above are eluted or worn out, the nuts 59 are loosened to disengage the electrode member 45*b* from the pressure member 60. The electrode member 45*b* can be easily replaced with a new one. During replacement, positioning of the electrode member 45*b* can be easily performed since the anisotropic conductive rubber member 57 is used.

Figure 38A:
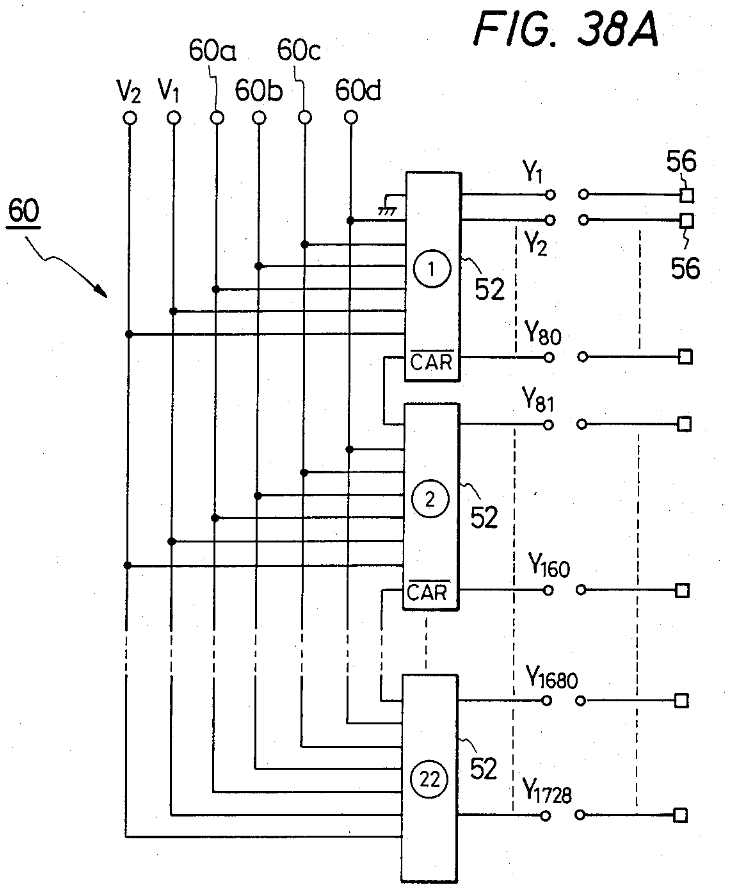
FIGS. 38A and 38B are views showing an arrangement of a drive circuit recording head shown in FIGS. 37A and 37B.
Figure 38B:
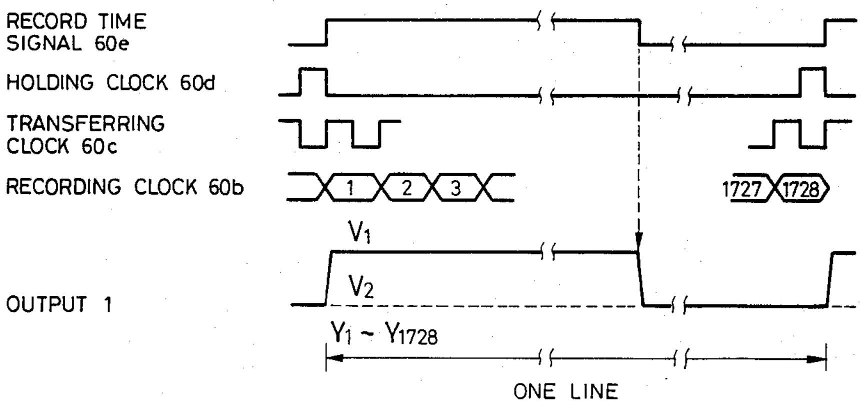

A control means for driving the above recording head 45 is shown in FIGS. 38A and 38B. More specifically, FIG. 38A is a view for explaining the circuit of a control means 60, and FIG. 38B is a timing chart for explaining the operation of the control means 60.

An operation for performing driving of a recording width of 216 mm every 8 pels will be described. 22 ICs 52 are used to perform recording for the above width since each IC drives 80 recording electrodes 56.

As shown in FIGS. 38A and 38B, a recording signal 60 for selectively driving the recording electrodes 56 is input as serial data from data lines, the recording signal 60 is transferred to the corresponding drive ICs in synchronism with a transfer clock 60*b*. The recording signal 60 is held by a holding clock 60 for a time period required for one line recording. While a record time signal 60*d* is kept at high level, the recording electrodes 56 are selectively set at a potential V1 or in a high-impedance state in accordance with the recording signal 60*a*, thereby energizing the ink 2 in accordance with the recording signal.

The recording head 45 is preferably arranged such that the recording electrodes 56 are slightly dipped in an ink layer formed on the ink transporting roll 1. A dipping amount preferably falls within the range of about 0 to 1 mm and more preferably about 0.1 to 0.5 mm. When the recording electrodes 56 are slightly dipped in the ink layer as described above, a better energization effect can be obtained. Even if the recording electrodes 56 are slightly dipped in the ink layer, no problem occurs since the ink 2 has viscoelasticity.

Figure 39:
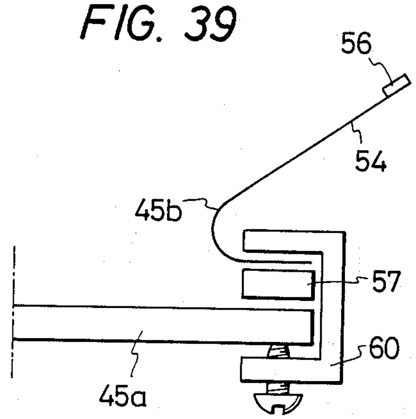
FIGS. 39, 40A, and 40B are views showing another arrangement of the recording head.

In the above embodiment, the base 54 for the electrode member 45*b* is made of a glass epoxy material. However, as shown in FIG. 39, a so-called flexible base (board) 54 made of polyimide or the like may be used as a base, and the recording electrodes 56 may be formed on the flexible base 54 to constitute the electrode member 45*b*. If the electrode member 45*b* is connected to the drive member 45*a* by the pressure member 60, contact of the recording electrodes 56 with the ink 2 can be further facilitated.

Figure 40A:
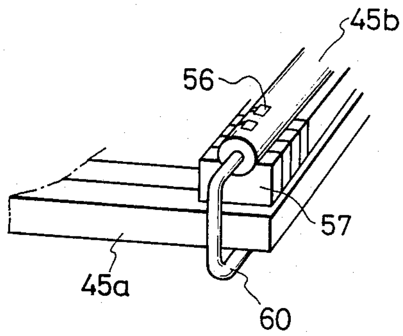
Figure 40B:
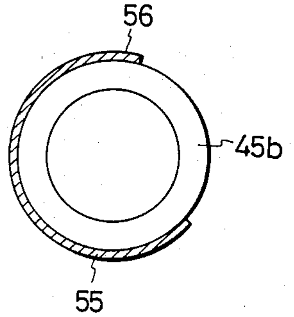

Furthermore, as shown in FIGS. 40A and 40B, a hollow cylindrical glass member may be used as a base 54, and the recording electrodes 56 may be formed on the outer surface of the hollow cylindrical glass according to a thin- or thick-film formation process, thereby constituting the electrode member 45*b*. The electrode member 45*b* is connected to the drive member 45*a* through the anisotropic conductive rubber member 57 by the pressure member 60, point contact of the electrode member 45*b* with the ink 2 can be achieved, and replacement of the electrode member 45*b* can be further facilitated.

In the above embodiment, a voltage is applied from each recording electrode 56 to the ink transporting roll 1 through the ink 2. However, a current may be supplied to the adjacent recording electrodes 56 constituting an array.

In the above embodiment, the recording head is divided into the electrode member and the drive member, and the drive and electrode members are electrically connected by the connecting means. Even if elution of the electrode member or its wear caused by friction with the ink occurs, only the electrode member in the recording head can be easily replaced with a new one.

According to the present invention as described above, there is provided an image recording apparatus capable of producing a clear image at low cost.

What is claimed is:

1. An image recording apparatus for recording an image on a recording medium, comprising:

ink transporting means for transporting a fluid ink;

energy applying means for selectively applying energy to the ink transported by said ink transporting means;

transfer means for transferring to the recording medium ink whose transfer characteristics are changed upon selectively application of the energy; and coating means, disposed upstream of said energy applying means with respect to a transporting direction of said ink transporting means so as to oppose said ink transporting means, for supplying ink having a predetermined thickness to said ink transporting means, wherein the distance between said ink transporting means and said coating means gradually decreases from the upstream to the downstream direction.

2. An apparatus according to claim 1, wherein said coating means comprises a rotatable roller member.

3. An apparatus according to claim 1, wherein a transporting force acting on the fluid ink by said coating means is smaller than a transporting force acting on the fluid ink by said ink transporting means.

4. An apparatus according to claim 1, wherein said energy applying means applies electrical energy.

5. An apparatus according to claim 1, wherein the ink which selectively receives the energy from said energy applying means is transferred to the recording medium through an intermediate transfer medium.

6. An apparatus according to claim 1, wherein said ink has fluidity and a film formation property.

7. An apparatus according to claim 1, wherein said ink lacks adhesivity when in a normal state and has adhesivity upon application to it of a predetermined amount of energy.

8. An apparatus according to claim 1, wherein the ink sequentially loses adhesivity after energy is no longer applied.

9. An apparatus according to claim 1, wherein said ink is an ink gel containing a solvent with a crosslinked substance.

10. An apparatus according to claim 1, wherein said ink is an ink sludge containing grains having a grain size within the range of 0.1 to 100 μm and dispersed in a solvent having a viscosity of at least about 5,000 cps.

11. An apparatus according to claim 1, wherein said ink has vicoelasticity.

12. An apparatus according to claim 1, wherein said ink transporting means includes a transporting roll having a roughened surface.

13. An apparatus according to claim 1, wherein the distance between said coating means and said ink transporting means is greater upstream of the rotation direction of said ink transporting means than on the downstream side, and said distance gradually decreasing toward the downstream side, and the thickness of ink layer to be supplied to said ink transporting means is controlled by the distance at the most downstream side.

14. An apparatus according to claim 1, wherein said energy applying means comprises a recording electrode having a plurality of electrode elements, said electrode elements in contact with an ink layer formed on the peripheral surface of said ink transporting roller when said recording electrode is disposed.

* * * * *

UNITED STATES PATENT AND TRADEMARK OFFICE
CERTIFICATE OF CORRECTION

PATENT NO. : 4,855,763 Page 1 of 3

DATED : August 8, 1989

INVENTOR(S) : Kan, deceased, et al.

It is certified that error appears in the above-identified patent and that said Letters Patent is hereby corrected as shown below:

On the title page:

[56]... References cited:

"37245767 7/1987 Fed. Rep. of Germany" should read --3724576 2/1988 Fed. Rep. of Germany--.

COLUMN 1:

Line 29, "e" should read --be--.

Line 51, "(Application No. 3724576.7" should read --(Application No. 3724576--.

COLUMN 2:

Line 49, "shown in FIGS. 5A and 5B; wherein" should read --shown in FIGS. 5A and 5B;
FIG. 7 is a view for explaining an arrangement wherein--.

Line 50, "coating" should read --coating means--.

COLUMN 9:

Line 35, "elements 5be" should read --elements 5b--.

UNITED STATES PATENT AND TRADEMARK OFFICE

CERTIFICATE OF CORRECTION

PATENT NO. : 4,855,763 Page 2 of 3

DATED : August 8, 1989

INVENTOR(S) : Kan, deceased, et al.

It is certified that error appears in the above-identified patent and that said Letters Patent is hereby corrected as shown below:

COLUMN 10:

Line 39, "b" should read --be--.

COLUMN 15:

Line 29, "stress o" should read --stress $\sigma$-- (Greek sigma sign).

COLUMN 17:

Line 3, "velocity w" should read --velocity $\omega$ --(Greek omega sign).

Line 24, "elastic module" should read --elastic moduli- --.

Line 48, "d=" should read --d∞--.

COLUMN 35:

Line 59, "o" should read --of--.

UNITED STATES PATENT AND TRADEMARK OFFICE
CERTIFICATE OF CORRECTION

PATENT NO. : 4,855,763 Page 3 of 3

DATED : August 8, 1989

INVENTOR(S) : Kan, deceased, et al.

It is certified that error appears in the above-identified patent and that said Letters Patent is hereby corrected as shown below:

COLUMN 38:

Line 7, "selectively" should read --selective--.

Line 47, "vicoelasticity." should read --viscoelasticity--.

Signed and Sealed this

Twelfth Day of March, 1991

*Attest:*

HARRY F. MANBECK, JR.

*Attesting Officer* *Commissioner of Patents and Trademarks*